(12) United States Patent (10) Patent No.: US 8,932,114 B2
Seigneur et al. (45) Date of Patent: Jan. 13, 2015

(54) CHAIN LINK SHARPENING METHOD AND APPARATUS

(75) Inventors: Christopher D. Seigneur, West Linn, OR (US); Lance Luedtke, Portland, OR (US)

(73) Assignee: Blount, Inc., Portland, OR (US)

( * ) Notice: Subject to any disclaimer, the term of this patent is extended or adjusted under 35 U.S.C. 154(b) by 298 days.

(21) Appl. No.: 13/411,417

(22) Filed: Mar. 2, 2012

(65) Prior Publication Data

US 2012/0222313 A1 Sep. 6, 2012

Related U.S. Application Data

(60) Provisional application No. 61/449,569, filed on Mar. 4, 2011.

(51) Int. Cl.
*B24B 3/42* (2006.01)
*B23D 63/16* (2006.01)
*B24B 3/14* (2006.01)

(52) U.S. Cl.
CPC ............... *B23D 63/168* (2013.01); *B24B 3/14* (2013.01)
USPC ............... 451/349; 451/419; 83/833; 30/138; 76/80.5

(58) Field of Classification Search
CPC .......... B24B 3/361; B24B 3/42; B24B 3/368; B24B 3/56; B24B 3/466; B26F 1/382; B24D 15/08
USPC ........ 451/349, 419; 76/80.5, 37; 83/833, 834; 30/138, 381
See application file for complete search history.

(56) References Cited

U.S. PATENT DOCUMENTS

| | | | |
|---|---|---|---|
| 2,508,784 | A | 5/1950 | Cox |
| 2,522,799 | A | 9/1950 | Pitcher |
| 2,558,678 | A | 6/1951 | Garrett |
| 2,642,102 | A | 6/1953 | Dunnington |
| 2,651,336 | A | 9/1953 | Warren |
| 2,729,987 | A | 1/1956 | Bluemink |
| 2,730,143 | A | 1/1956 | Ryde |
| 2,744,548 | A | 5/1956 | Stephenson et al. |
| 2,744,584 | A | 5/1956 | Hellon |
| 2,821,097 | A | 1/1958 | Carlton |
| 2,832,180 | A | 4/1958 | Carlton |

(Continued)

FOREIGN PATENT DOCUMENTS

| | | |
|---|---|---|
| DE | 3734148 A1 | 4/1989 |
| RU | 2021885 C1 | 10/1994 |

(Continued)

OTHER PUBLICATIONS

Omark Industries of Canada Ltd.; "Omark Industries of Canada Ltd. Presents Oregon Power-Sharp System to Pioneer Saws Ltd.;" Canada; 1960s (date estimated).

(Continued)

*Primary Examiner* — George Nguyen
(74) *Attorney, Agent, or Firm* — Schwabe Williamson & Wyatt

(57) ABSTRACT

Embodiments provide various components of a chain saw, including saw chain elements, sprockets, and other fixtures, that may facilitate sharpening of cutter links during operation. In various embodiments, the components may increase stability during sharpening, provide nose mounted sharpening fixtures, and/or facilitate the resizing and/or reshaping of a sharpening element.

12 Claims, 13 Drawing Sheets

(56) References Cited

U.S. PATENT DOCUMENTS

| | | | |
|---|---|---|---|
| 2,832,380 A | 4/1958 | Crowe | |
| 2,869,534 A | 1/1959 | Stihl | |
| 2,884,031 A | 4/1959 | Standal | |
| 2,912,968 A | 11/1959 | Stihl | |
| 2,916,771 A | 12/1959 | Lang et al. | |
| 2,924,110 A | 2/1960 | Gudmundsen | |
| 2,976,900 A | 3/1961 | Mills | |
| 2,986,797 A | 6/1961 | Aisenberg | |
| 2,989,096 A | 6/1961 | Irgens | |
| 3,040,602 A | 6/1962 | Carlton | |
| 3,066,711 A | 12/1962 | Winnlert et al. | |
| 3,138,973 A | 6/1964 | Muir | |
| 3,147,644 A | 9/1964 | Oehrli | |
| 3,170,497 A | 2/1965 | Ehlen et al. | |
| 3,180,001 A | 4/1965 | Nash | |
| 3,180,378 A | 4/1965 | Carlton | |
| 3,183,948 A | 5/1965 | Carlton | |
| 3,186,028 A | 6/1965 | Dobbins et al. | |
| 3,189,064 A | 6/1965 | Frederickson | |
| 3,191,225 A | 6/1965 | Polka | |
| 3,224,040 A | 12/1965 | Bridges et al. | |
| 3,260,287 A | 7/1966 | Oehrli | |
| 3,263,717 A | 8/1966 | Silvon | |
| 3,269,431 A | 8/1966 | Ehlen | |
| 3,301,098 A | 1/1967 | Oehrli | |
| 3,308,859 A | 3/1967 | Ehlen | |
| 3,346,025 A | 10/1967 | Anderson et al. | |
| 3,361,012 A | 1/1968 | Fullerton | |
| 3,380,496 A | 4/1968 | Hill | |
| 3,435,860 A | 4/1969 | Silvon | |
| 3,457,969 A | 7/1969 | Carter | |
| 3,465,617 A | 9/1969 | Silvon | |
| 3,465,795 A | 9/1969 | Tupper | |
| 3,469,610 A | 9/1969 | Silvon | |
| 3,473,582 A | 10/1969 | Lanz et al. | |
| 3,487,591 A | 1/1970 | Silvon | |
| 3,502,122 A | 3/1970 | Silvon | |
| 3,516,459 A | 6/1970 | Silvon et al. | |
| 3,526,156 A | 9/1970 | Condon et al. | |
| 3,527,122 A | 9/1970 | Oehrli | |
| 3,529,495 A | 9/1970 | Graversen | |
| 3,534,638 A | 10/1970 | Van Ourkerk | |
| 3,543,612 A | 12/1970 | Silvon | |
| 3,545,508 A | 12/1970 | Tupper | |
| 3,569,689 A | 3/1971 | Nestrock | |
| 3,581,785 A | 6/1971 | Neumeier | |
| 3,596,689 A | 8/1971 | Oehrli | |
| 3,601,167 A | 8/1971 | Dolata | |
| 3,603,179 A | 9/1971 | Stihl | |
| 3,613,749 A | 10/1971 | Geurian | |
| 3,714,974 A | 2/1973 | Bullard | |
| 3,744,349 A | 7/1973 | Juncker | |
| 3,889,556 A | 6/1975 | Bair et al. | |
| D237,248 S | 10/1975 | Santore | |
| 3,921,490 A | 11/1975 | Dolata et al. | |
| 3,942,255 A | 3/1976 | Bakoledis | |
| 4,023,453 A | 5/1977 | Dolata et al. | |
| D246,756 S | 12/1977 | Smyth et al. | |
| 4,062,253 A | 12/1977 | Dilworth | |
| D250,086 S | 10/1978 | Granberg | |
| D256,426 S | 8/1980 | Aksamit | |
| D257,527 S | 11/1980 | Aksamit | |
| 4,348,926 A | 9/1982 | Dolata et al. | |
| 4,348,927 A | 9/1982 | Olmr | |
| 4,353,277 A | 10/1982 | Silvon | |
| 4,355,551 A | 10/1982 | Kolleas | |
| 4,382,334 A | 5/1983 | Reynolds | |
| 4,385,532 A * | 5/1983 | Dolata et al. | 76/80.5 |
| 4,393,739 A | 7/1983 | Olmr | |
| 4,404,871 A | 9/1983 | Fritz et al. | |
| 4,404,872 A | 9/1983 | Fritz | |
| 4,409,874 A | 10/1983 | Nitschmann et al. | |
| D271,276 S | 11/1983 | Reynolds | |
| 4,438,667 A | 3/1984 | Hannah | |
| 4,457,069 A | 7/1984 | Close | |
| 4,463,499 A | 8/1984 | Fritz | |
| 4,473,176 A * | 9/1984 | Harper | 224/569 |
| 4,503,735 A | 3/1985 | Jackson | |
| 4,506,565 A | 3/1985 | Potter | |
| 4,530,258 A * | 7/1985 | Gibson et al. | 76/80.5 |
| 4,530,679 A | 7/1985 | Reynolds | |
| 4,535,667 A | 8/1985 | Gibson et al. | |
| 4,567,792 A | 2/1986 | Baldwin | |
| 4,581,968 A | 4/1986 | Gibson et al. | |
| 4,597,178 A | 7/1986 | Dolata et al. | |
| D285,899 S | 9/1986 | Bohman et al. | |
| 4,625,610 A | 12/1986 | Petrovich | |
| 4,643,065 A | 2/1987 | MacGavin | |
| 4,677,881 A | 7/1987 | Jorde | |
| 4,785,700 A | 11/1988 | Petrovich et al. | |
| 4,813,323 A | 3/1989 | Harfst | |
| 4,843,718 A | 7/1989 | Nagashima et al. | |
| 4,864,897 A | 9/1989 | Newman | |
| 4,896,575 A | 1/1990 | Sundström | |
| 4,911,050 A | 3/1990 | Nitschmann | |
| 4,966,055 A | 10/1990 | Staggs | |
| 5,056,395 A | 10/1991 | Wovak | |
| 5,098,348 A | 3/1992 | O'Neel | |
| 5,184,598 A | 2/1993 | Bell | |
| 5,215,072 A | 6/1993 | Scott | |
| 5,666,871 A | 9/1997 | Burrows et al. | |
| 5,671,725 A | 9/1997 | Dishaw | |
| 5,740,715 A | 4/1998 | Burrows et al. | |
| 5,974,933 A | 11/1999 | Burrows et al. | |
| 6,006,629 A * | 12/1999 | Lofgren | 76/80.5 |
| 6,058,806 A | 5/2000 | Ford | |
| 6,128,997 A | 10/2000 | Nitschmann | |
| 6,161,453 A | 12/2000 | Hensley | |
| RE37,288 E | 7/2001 | Burrows et al. | |
| 6,283,112 B1 | 9/2001 | Berglund | |
| 6,334,809 B1 | 1/2002 | Spang | |
| 6,389,700 B2 | 5/2002 | Paquin | |
| 6,435,070 B1 | 8/2002 | Weber | |
| 6,446,534 B1 | 9/2002 | Harfst | |
| 6,748,840 B2 | 6/2004 | Harfst | |
| 6,871,573 B2 | 3/2005 | Mang | |
| 7,381,120 B2 | 6/2008 | Henry | |
| 7,434,575 B2 | 10/2008 | Lehmann | |
| 7,900,536 B2 | 3/2011 | Hensley et al. | |
| D663,602 S | 7/2012 | Seigneur | |
| 8,746,118 B2 * | 6/2014 | Seigneur et al. | 83/788 |
| 2003/0213344 A1 | 11/2003 | Andress | |
| 2004/0134478 A1 | 7/2004 | Bailey | |
| 2004/0182216 A1 | 9/2004 | Morrison | |
| 2005/0115379 A1 | 6/2005 | Schulz et al. | |
| 2005/0268765 A1 | 12/2005 | Chien | |
| 2007/0167122 A1 | 7/2007 | Henry | |
| 2007/0169598 A1 | 7/2007 | Szymanski | |
| 2007/0238402 A1 | 10/2007 | Hensley et al. | |
| 2009/0199680 A1 | 8/2009 | Jorde | |
| 2010/0005666 A1 | 1/2010 | Seigneur et al. | |
| 2011/0030223 A1 | 2/2011 | Seigneur et al. | |

FOREIGN PATENT DOCUMENTS

| | | |
|---|---|---|
| SU | 294302 A3 | 4/1994 |
| WO | WO9600627 | 1/1996 |
| WO | WO9900211 | 1/1999 |
| WO | WO9938638 | 8/1999 |
| WO | WO0123128 | 4/2001 |

OTHER PUBLICATIONS

Craftsman; "Owner's Manual, Craftsman 3.7 Chain Saw or 3.7PS Chain Saw;" Sears, Roebuck and Co., p. 779J-14.3.79; Chicago, Illinois, USA; 1979 (date estimated).

Power Sharp Starter Kit; downloaded Mar. 24, 2011 at http://www.powersharp.com/powersharp_StarterKit-single.asp.

Powersharp; Sharpens Chain on the Saw, on the Job, in Seconds; downloaded Mar. 24, 2011 at http://www.powersharp.com/.

* cited by examiner

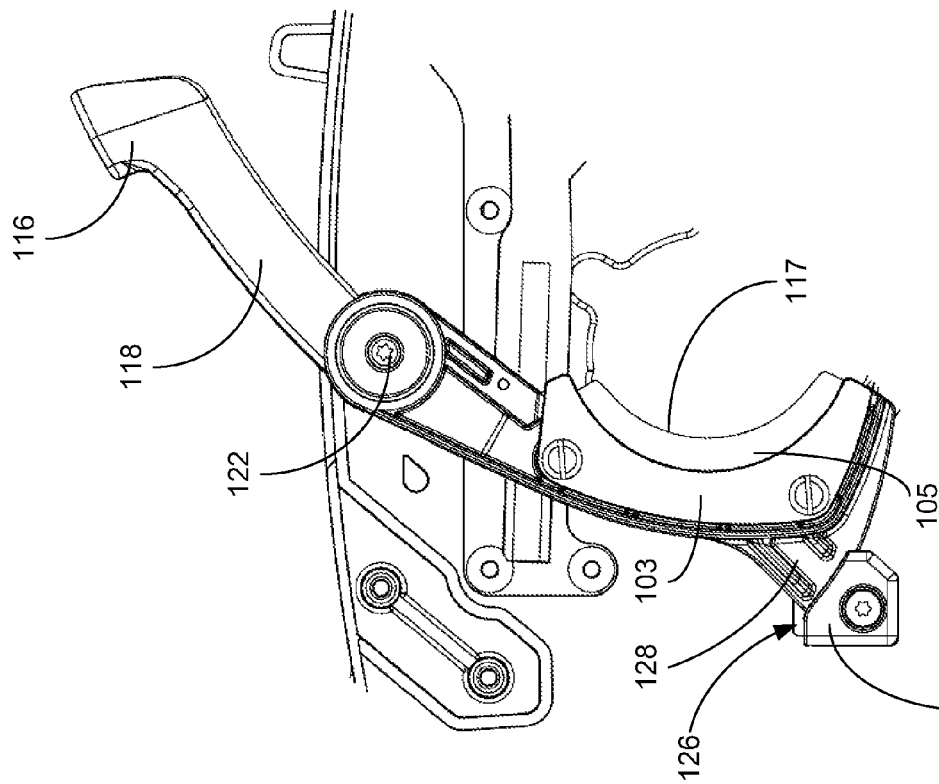
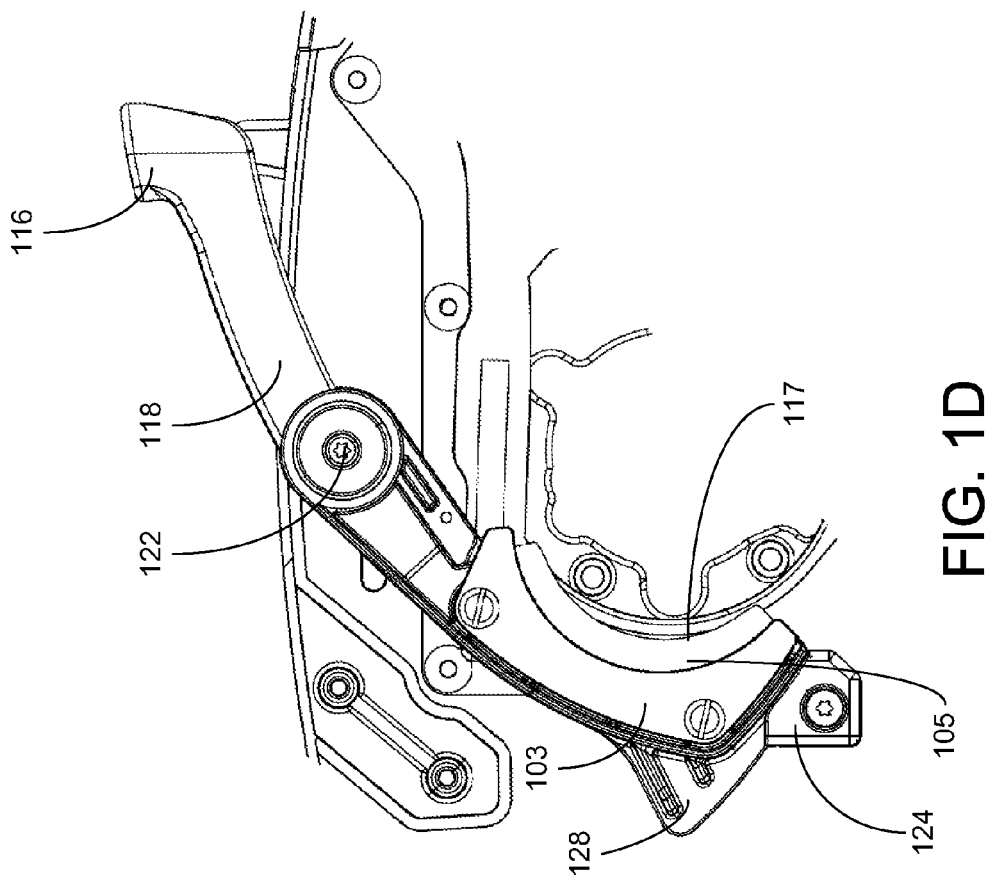

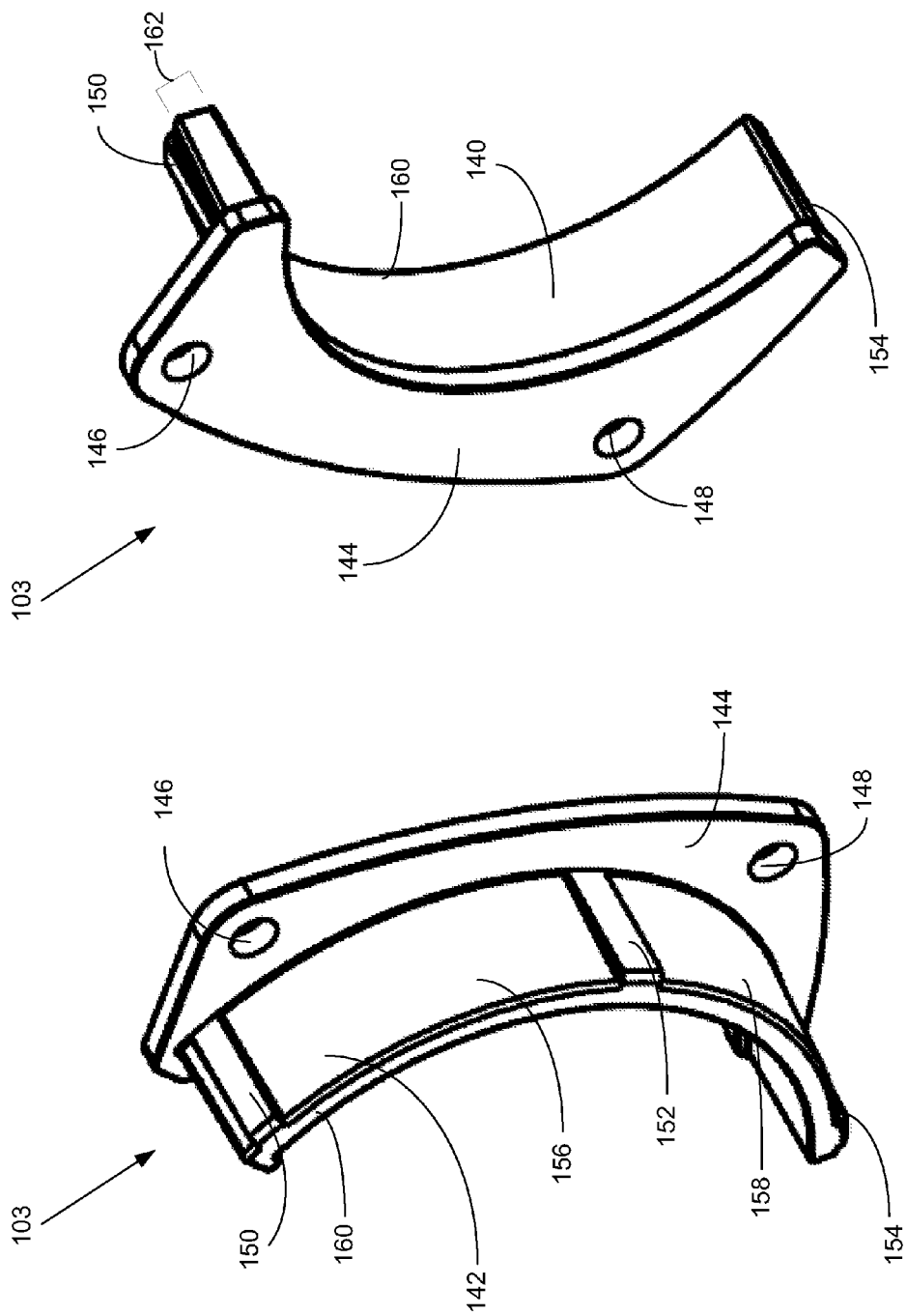

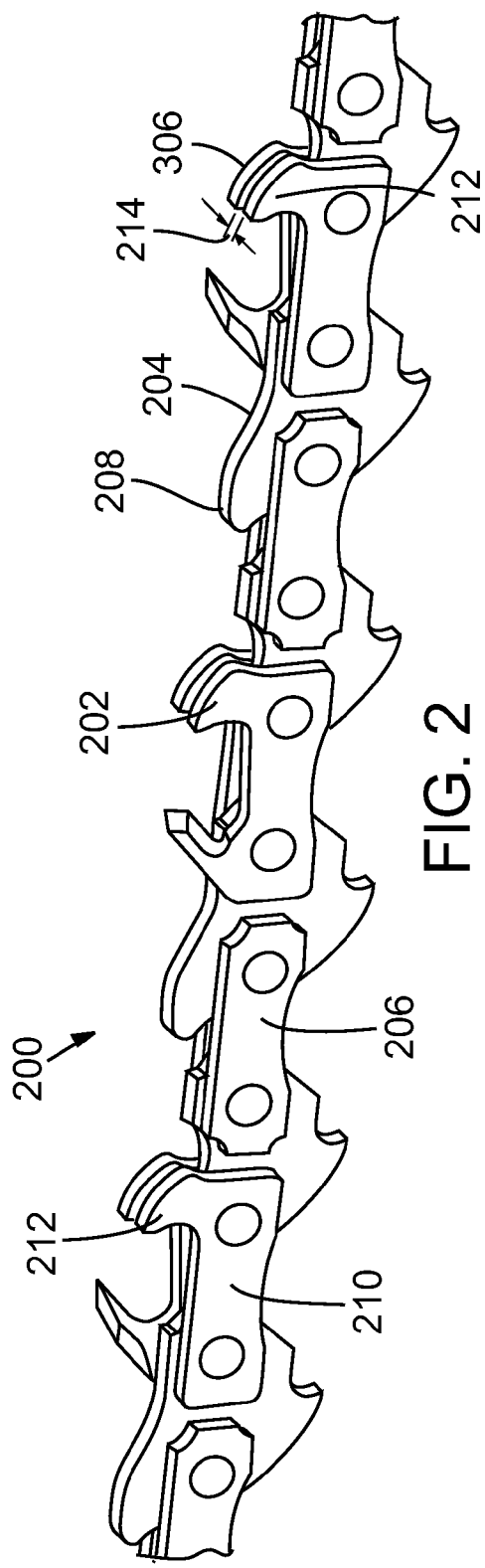

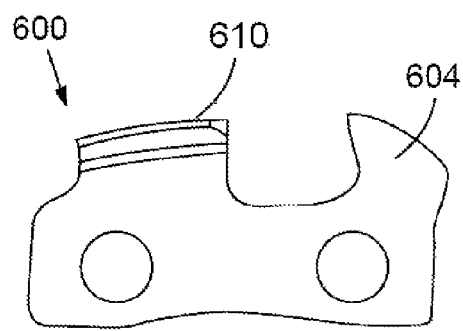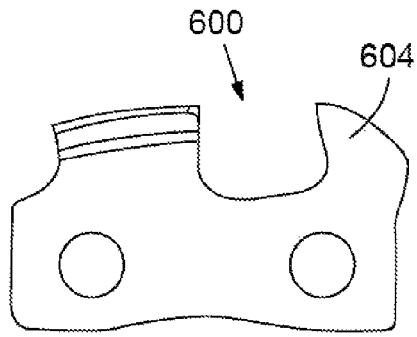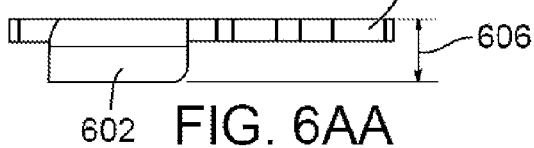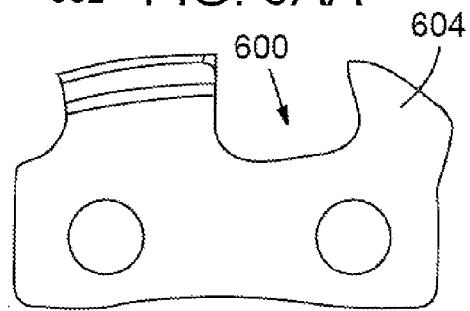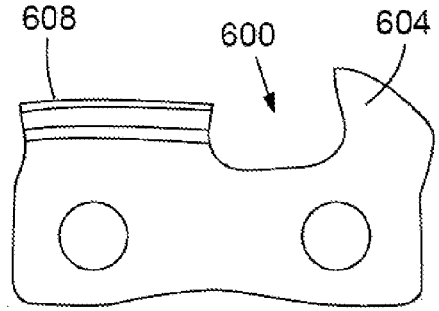
FIG. 6A  FIG. 6B  FIG. 6AA  FIG. 6C  FIG. 6D

CHAIN LINK SHARPENING METHOD AND APPARATUS

CROSS REFERENCE TO RELATED APPLICATIONS

The present application claims priority to U.S. Provisional Patent Application No. 61/449,569, filed Mar. 4, 2011, titled "CHAIN LINK SHARPENING METHOD AND APPARATUS," the entire disclosure of which is hereby incorporated by reference in its entirety except for those sections, if any, that are inconsistent with this specification.

The present application is related to U.S. patent application Ser. No. 12/492,017, filed Jun. 25, 2009, titled "Chain Link Sharpening Method and Apparatus," which claims priority to U.S. Provisional Patent Application No. 61/111,145, filed Nov. 4, 2008, titled "Chain Link Sharpening Method and Apparatus," and to U.S. Provisional Patent Application No. 61/078,951, filed Jul. 8, 2008, titled "Chain Link Sharpening," the entire disclosures of which are hereby incorporated by reference in their entirety except for those sections, if any, that are inconsistent with this specification. Additionally, the present application is related to U.S. patent application Ser. No. 12/470,456, filed, May 21, 2009 titled "Utility Chain Cutter," which claims priority to U.S. Provisional Patent Application 61/079,405, filed Jul. 9, 2008, the specifications of which are hereby incorporated by reference in their entirety except for those sections, if any, that are inconsistent with this specification.

TECHNICAL FIELD

Embodiments herein relate to the field of chain saws, and, more specifically, to chain saw components configured to facilitate sharpening of cutter links as they traverse a portion of the guide bar or drive sprocket.

BACKGROUND

Chain saws are typically used to fell trees, trim branches, and cut a variety of materials, among other tasks. They generally include an engine enclosed within a housing, a guide bar extending from the housing, and an endless saw chain loop that may include various links such as, but not limited to, cutter links, center links, side links, tie straps, and drive links. Through use, the cutting surfaces of various links may become dulled and worn. As the cutting surfaces experience wear, an increased amount of force is required to produce a desired cut, which is inefficient and consumes energy. Therefore, cutter links of saw chains are periodically sharpened to maintain efficiency in a cutting operation.

One method of sharpening cutter links includes positioning a sharpening element (e.g. an abrasive stone) within the housing of the chain saw. The sharpening element may be positioned so as to contact the various saw chain links as they traverse a drive sprocket, typically at high speeds. These systems, however, have drawbacks. For example, one or more grooves may be worn into the surface of the sharpening element from the repeated contact of the various saw chain links. These grooves may cause the cutting edge to become deformed during the sharpening process or otherwise negatively impact the ability to maintain a proper cutting edge. Any deformation in the cutting edge may ultimately impact the ability of the chain saw to cut various materials.

Additionally, the positioning of the abrasive stone and the high speed at which the cutter links traverse the drive sprocket may result in the unintentional impact of cutter links into the abrasive stone. This tendency may result in an interface that allows undesired movement of the cutter relative to the stone (e.g. tipping or rocking), and/or it may also serve to deform the cutter link, any of which may ultimately result in a decrease in performance.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1D illustrates a lever arm in the fully unengaged position in accordance with various embodiments;

FIG. 1E illustrates a lever arm in the engaged position in accordance with various embodiments;

FIGS. 1H-1I illustrate perspective views of a stone holder in accordance with various embodiments;

FIG. 2 illustrates a section of a saw chain in accordance with various embodiments;

FIGS. 6A-6D and 6AA illustrate dresser links in accordance with various embodiments;

DETAILED DESCRIPTION OF DISCLOSED EMBODIMENTS

Figure 1A:
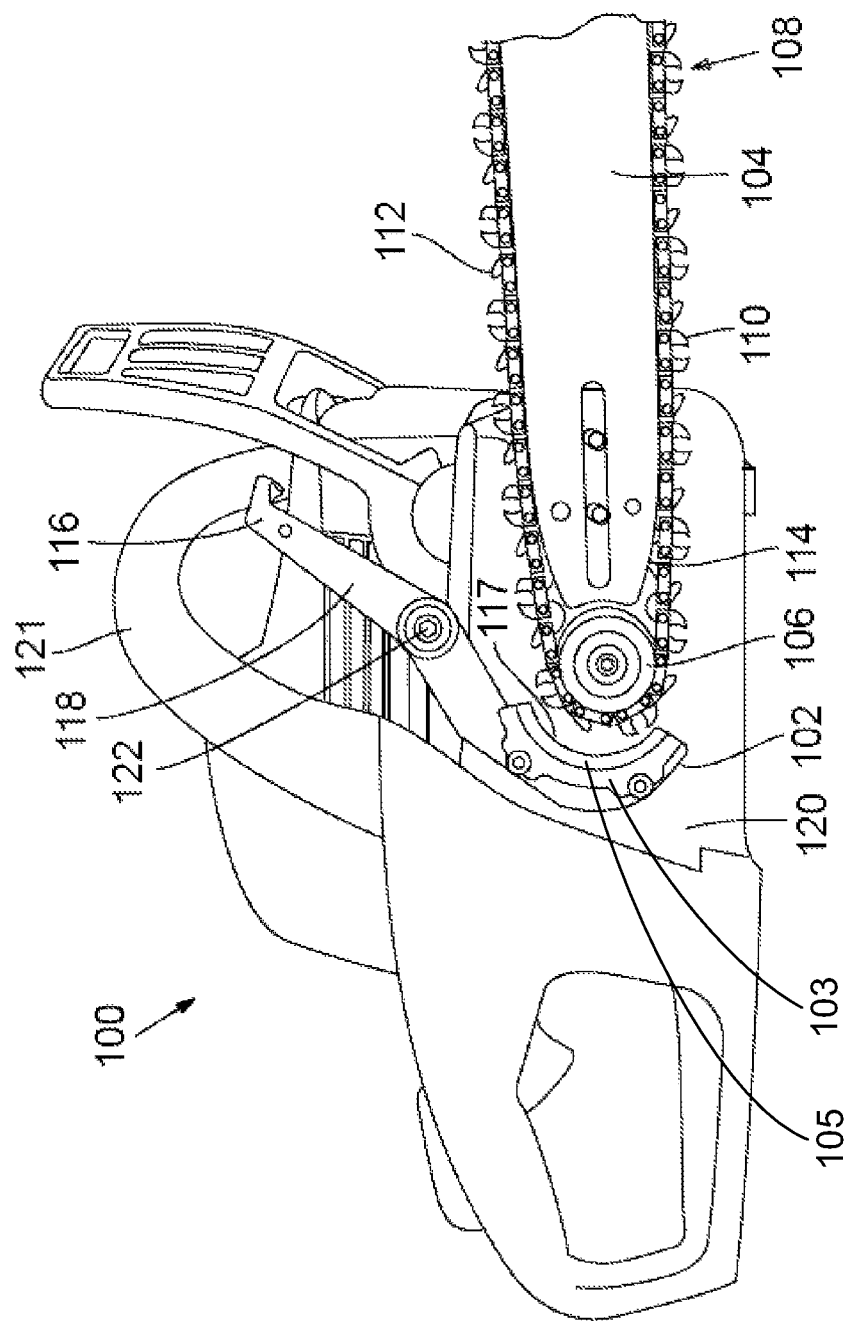
FIG. 1A illustrates a chainsaw in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments of the present disclosure, methods, apparatuses, and systems for providing a more effective and reliable sharpening mechanism for saw chains are provided. In exemplary embodiments, a saw chain is provided with one or more elements configured to facilitate sharpening. For example, saw chain may be provided with cutting links including depth gauges configured to provide support, set the depth of cut, and reduce undesirable wear of the sharpening element; center links or drive links including projection elements configured to help stabilize cutter links; and/or conditioning or dresser links configured to condition the sharpening element, including but not limited to helping shape, clean, treat, even out wear, and/or resize the sharpening element.

In various embodiments, cutting elements may be adapted to engage a sharpening element as it traverses a drive sprocket, a nose sprocket, and/or another portion of a guide bar. The cutting elements may include a link plate defining a first plane and have a cutting portion twisted out of the first plane about a twist axis, which, in some embodiments, forms an acute angle with a horizontal centerline of the link plate. The cutting element may be adapted to be sharpened on an upper edge of the cutting portion to form a cutting edge. In various embodiments, the cutting element may include one or more depth gauges positioned in front of the cutting edge, for example disposed on the link plate and/or a second link plate opposite the cutter link plate. The depth gauges may be configured to engage a groove of a sharpening element to help maintain a desired height, and or to assist in conditioning the sharpening element (e.g. help general groove shape) in conjunction with other elements. In various embodiments, the depth gauges may minimize and/or correct uneven groove wear, thereby reducing damage to the cutting element.

In various embodiments, projection elements or stabilizer portions, referred to interchangeably, may be disposed between cutter links in a saw chain. The projection elements may serve to provide additional points of contact with the sharpening stone beyond the typical two points of contact generated with the cutter and a single depth gauge. Achieving three or more points of contact with the sharpening element has been found to provide improved stability and support as the cutter links traverse the drive sprocket and sharpening element. The multiple points of contact also help minimize gaps between the various saw chain components, and consequently, reduce the opportunity for them to engage in adverse impacting with the sharpening element. The projection elements may also help to condition the sharpening elements, such as helping to ensure a consistent groove is worn in the sharpening element by removing material between various grooves that might otherwise form on a sharpening element due to sharpening of cutter links.

In various embodiments, dresser links or conditioning links may be used to condition (e.g. refine, reshape, clean and/or otherwise modify) the grinding surface of the sharpening element to allow it to continue to properly and effectively sharpen the cutters. The conditioning link may be a separate link having a desired geometrical configuration, or may be a modified cutter link having an appropriate abrasive material adhered thereto to help facilitate reformation and/or maintenance of a surface and/or a groove in the sharpening element. Conditioning links may have one or more link plates having portions upstanding that define a plane and an upper surface bent out of the plane. In various embodiments conditioning material may be adhered to the upper surface and/or surrounding surfaces and conform to one or more surface curvatures. The conditioning material may clean the sharpening element, or alternatively, facilitate reformation of the sharpening element. In some embodiments, the rear edge of the conditioning link's upper surface may contact the sharpening element to clean and/or reform the sharpening element. In some such embodiments, a conditioning material may be adhered to a plurality of surfaces adjacent to the rear edge to prevent/reduce breakdown of the conditioning material at the rear edge.

In various other embodiments, components other than the various links of a saw chain may be utilized to provide a more effective and reliable sharpening mechanism to sharpen the saw chain as it traverses the guide bar. For example, a multi-faceted drive sprocket may be used to increase stability of the cutter link chassis during a sharpening process. The multi-faceted drive sprocket may be configured to provide a support surface contact for a cutter link's heel, toe and/or other rail engaging component. The support surface, in various embodiments, may provide enhanced support to the bottom of the cutter link and reduce the tendency of the cutter to rock during traversal and sharpening. Additionally, the support surface may help position components of the cutter link relative to the stone. For example, the support surface may be configured to urge the depth gauge upward relative to the cutter, so that material from the depth gauge is removed. This may help ensure a proper cutting relationship between the cutter and the depth gauge.

In various embodiments, the sharpening element may be selectively brought into contact with one or more of the various links of the saw chain by an actuator. The actuator may be any suitable mechanism. For example, the sharpening element may be disposed on a first end of a lever arm and the actuator may be a handle on a second end of the lever arm. The lever arm may be coupled to the chain saw at a pivot point between the first end and the second end. When pivoting, as the actuator is moved away from the saw chain, the sharpening element may move toward the saw chain. The sharpening element may be disposed at least partially within a housing of the chainsaw, and the actuator may extend from the housing to be accessed by the user. The actuator may be located in a position so that the actuator may be actuated by the user while keeping the user's hands on one or more handles of the chainsaw. For example, the actuator may be located in the vicinity of a front handle of the chainsaw, such as below the front handle. In this position, the user may actuate the actuator with one or more fingers while keeping one or more remaining fingers on the handle. This position may provide safe control of the chainsaw during sharpening.

In other embodiments, the actuator may be a push slide that engages a pivoting arm. The sharpening element may be disposed on the pivoting arm. In these embodiments, the sharpening element may be brought into contact with the saw chain by pushing on the push slide. In some embodiments, the push slide may be located near the front handle or near the rear handle of the chainsaw.

The lever arm may travel on a path between a fully unengaged position in which the sharpening element is not in contact with the saw chain and an engaged position in which the sharpening element is in contact with the saw chain. The lever arm may be biased, e.g., spring-loaded, to the fully unengaged position. Similarly, the lever arm may include a stop mechanism to prevent the lever arm from traveling past the fully unengaged position as the sharpening element moves away from the saw chain. Activation of the actuator, e.g., pulling on the handle of the lever arm, may bring the sharpening element into contact with one or more links of the saw chain. When the saw chain is traversing the guide bar while the lever arm is in the engaged position, the sharpening element may grind and/or sharpen one or more of the links of the saw chain, as described in more detail herein.

In various embodiments, the sharpening element may include a sharpening stone coupled with a stone holder. The stone holder may be coupled to a mounting surface of the lever arm. In some embodiments, the sharpening stone may have a curved surface with a center of curvature. For example, the sharpening stone may be substantially crescent-shaped. The stone holder may have a front surface coupled with the sharpening stone and a rear surface coupled with the mounting surface of the lever arm. The rear surface of the stone holder and the mounting surface of the lever arm may be curved. The stone holder may further include a mounting plate for releasably coupling the stone holder to the lever arm. The mounting plate may be substantially perpendicular to the front surface of the stone holder and extend rearward, i.e., past the rear surface. The mounting plate may releasably couple to the lever arm via screws placed through the side of the lever arm, or via another suitable mechanism.

In various embodiments, the rear surface of the stone holder may have a plurality of contacting portions having contacting surfaces that contact the curved mounting surface of the lever arm. The contacting portions may be separated by recessed portions of the rear surface that may not contact the mounting surface of the lever arm.

The contacting portions of the stone holder may be substantially perpendicular to the mounting plate of the stone holder. In some embodiments, the recessed portions may also be perpendicular to the mounting plate of the stone holder. In other embodiments, the recessed portions may be ramped downward toward a peripheral portion of the rear surface (i.e., away from the mounting plate of the stone holder), so that the recessed portions are further recessed from the contacting surfaces as they move away from the mounting plate. In this ramped configuration, a width of the stone holder between the front surface and the recessed portions of the rear surface may be greatest at or near the mounting plate and may be lower toward the peripheral portion. The ramped configuration of the recessed portion may provide draft to allow the stone holder to be released from a mold during manufacture. The contacting portions may provide proper alignment of the sharpening stone on the lever arm. Furthermore, the contacting portions may allow some irregularity in the surface of the recessed portions without detrimentally affecting alignment of the stone holder in the sharpening arm which could otherwise detrimentally affect performance of the sharpening stone.

The stone holder may be composed of any suitable material or materials. In some embodiments, the stone holder may be substantially rigid to support the brittle stone against deflection induced by vibration which may damage the sharpening stone. For example, the stone holder may be composed of metal, such as aluminum and/or steel.

In some embodiments, various parameters of the sharpening stone may be adjusted depending on the operating conditions of the saw. For example, the hardness, density, and/or thickness of the sharpening stone may be adjusted depending on the speed of the saw chain and/or the force that is or may be applied to the actuator to sharpen the chain. In an electric chainsaw, the saw chain may travel with a slower speed than in a gas-powered chainsaw. Accordingly, a softer, less dense, and/or thicker sharpening stone may be used for an electric chainsaw compared with a gas-powered chainsaw.

The lever arm may be configured so that the path of the lever arm provides a substantially tangent contact, i.e., a tangent or near tangent contact, between the curved surface of the sharpening stone and the upper edge, i.e., the top plate, of the cutter link on the saw chain. The path may be provided by locating the sharpening element on the lever arm so that a path line of the center of curvature of the sharpening stone passes through or just slightly below a center of the drive sprocket. That is, a first distance between the pivot point of the lever arm and the center of curvature of the sharpening element may be substantially equal to or slightly longer than a second distance between the pivot point and the center of the drive sprocket. Such a path may facilitate the sharpening process and prevent the top plate of the cutter link from catching the lower edge of the sharpening element, which may otherwise chip the sharpening element and/or damage the cutter top plate. In some embodiments, the first distance may be about 0 to about 0.10 inches longer than the second distance, or more particularly about 0 to about 0.050 inches longer than the second distance, such as about 0 to about 0.030 inches longer than the second distance. In some embodiments, the sharpening element may further include a lead-in feature on an approach surface of the sharpening element to prevent damage to the cutter and sharpening element when the cutter first contacts the sharpening element. After first contact, the curved surface of the sharpening stone may substantially conform to the path of the saw chain and/or dresser links.

Additionally, in some embodiments, the pivot point of the lever arm may be located so that the sharpening element first contacts the top plate of the cutter element after a forward drive link (i.e., the drive link coupled adjacent to the cutter link in the direction of travel (ahead of the cutter link)), is seated in the gullet of the drive sprocket and the cutter notch is seated on the spur sprocket tooth. In some embodiments, the sharpening element may first contact the top plate of the cutter element when the forward drive link and a rearward drive link (i.e., the drive link coupled adjacent to the cutter link in the direction opposite the direction of travel (behind the cutter link)), are seated in the gullet of the drive sprocket. In embodiments including a rim sprocket, the heel and toe of the cutter may be in contact with the outer diameter of the rim when the sharpening element first contacts the cutter top plate.

The sharpening element may be subjected to considerable forces when grinding the various links of the saw chain. In some cases, the forces may cause the sharpening element to move and/or rotate laterally, i.e., away from a plane of the guide bar. The movement and/or rotation of the sharpening element may lessen the effectiveness of the sharpening element, may cause the sharpening element to become misaligned, and/or may damage the cutting edges of the cutter links.

Accordingly, various embodiments may include a retainer guide coupled to the chain saw to provide lateral support to the sharpening element. The lever arm may include a support element, such as an extending edge configured to be at least partially disposed within a groove of the retainer guide. For example, the support element may be disposed at or near the end of the lever arm that includes the sharpening element. For example, the support element may extend from the back of the lever arm at or near the sharpening element. This location of the support element may provide suitable lateral support in conjunction with the lateral support at the pivot point.

In some embodiments, at least a portion of the support element may be disposed within the groove of the retainer guide during the entire path of the lever arm, e.g., from the fully unengaged position to the engaged position. In other embodiments, there may be points along the path of the lever arm in which the support element is not disposed within the groove. However, at least a portion of the support element may be disposed within the groove when the lever arm is in the engaged position. Support element may or may not contact the groove.

In various embodiments, the retainer guide may provide lateral support to the sharpening element. The groove of the retainer guide may be configured to provide lateral support without substantially hindering the travel of the lever arm on its path. The lateral support may prevent/reduce rattling of the sharpening element when the sharpening element is grinding on the various links of the saw chain. The lateral support may improve the grinding effectiveness of the sharpening element. Furthermore, the lateral support may prevent/reduce misalignment of the sharpening element.

Repeated lateral movement of the lever arm, such as movement that may be caused by vibration from operation of the chainsaw, may damage the lever arm, especially at or near the pivot point. Accordingly, in some embodiments, the retainer guide may provide additional lateral support to the support element when the lever arm is in an unengaged position, such as the fully unengaged position. For example, the support element and/or retainer guide may be configured so that the support element contacts the groove in an unengaged position. In some embodiments, the groove may be narrower and/or the support element may have a protrusion or thicker edge that contacts the retainer guide at or near the fully unengaged position. The additional support may prevent/reduce lateral movement and/or rattling of the lever arm, thereby reducing potential damage to the lever arm. The retainer guide may hold the support element in the unengaged position unless the lever arm is subjected to a reasonable amount of force from the actuator to dislodge it.

In some embodiments, a separate component from the retainer guide may provide the additional lateral support when the lever arm is in an unengaged position. For example, a docking feature may receive a rear edge of the support element to provide support to the lever arm when the lever arm is in the unengaged position.

Additionally, the lateral support provided by the retainer guide may prevent/reduce damage to the lever arm in the event the saw chain is thrown from the guide bar and impacts the lever arm. The end of the lever arm may be vulnerable to damage from a thrown chain because of the distance from the pivot point and the proximity to the guide bar. However, the retainer guide may provide lateral support to diffuse the impact energy of the thrown chain and/or provide a physical obstacle to the chain.

In various embodiments, the support element may be coupled to the lever arm and/or the sharpening element. In some embodiments, the retainer guide and/or the support element may be removable. In these embodiments, the retainer and/or support element may be removed and replaced if they become worn or broken. In other embodiments, the support element may be part of the same component as the lever arm.

In an embodiment, the stone holder and/or stone may be removable. In these embodiments, the stone holder and/or stone may be removed and replaced if they become worn or broken. In other embodiments, the stone holder and/or stone may be an integrated component of the lever arm.

In some embodiments, the body of the chainsaw and/or the retainer guide may include a raised lateral support toward the body of the chainsaw. The raised lateral support may be raised from the surface of the saw body to provide a gap between the lever arm and the body of the chainsaw. The gap may allow debris from cutting to pass through, thereby preventing/reducing clogging.

In some embodiments, the support element may further include a projected boss that slides against the body of the chainsaw. The projected boss may provide support to the support element and/or the lever arm to prevent them from moving and/or rotating toward the body of the chainsaw.

In various embodiments, the support element and retainer guide may be made from any suitable material or materials. In some embodiments, the vibration on the lever arm from sharpening the saw chain may be from about 500 to 2000 Hertz, which could cause linear friction welding between the support element and the retainer guide with some materials. Accordingly, in some embodiments, the materials may be chosen to prevent linear friction welding between the support element and retainer guide. For example, one or both of the support element and/or retainer guide may be made of a material that prevents and/or resists friction welding, such as steel, aluminum, and/or a thermoset plastic. If either the support element or retainer guide is composed of a material that may be susceptible to linear friction welding, such as a thermoformed plastic, the other component (e.g., the other one of the support element or the retainer guide) may be made from a material that may prevent and/or resist welding (e.g., steel, aluminum, and/or a thermoset plastic).

In various embodiments, a removable sharpening element housing may be secured to the guide bar at a desired location (e.g. the nose) and have a sharpening element actuator that facilitates engagement between the saw chain components and the sharpening element. The removable sharpening element housing, sharpening element, and chain component may interface in a similar manner as that encountered when the sharpening element is disposed proximal to the drive sprocket.

As will be discussed in more detail herein, these components may be used individually or in combination to provide a more reliable sharpening mechanism. The invention is not to be limited in this regard.

Referring to FIGS. 1A-3, various embodiments of a chain saw are discussed. A chain saw apparatus 100, saw chain 200, and saw chain component 202 are illustrated, in accordance with various embodiments. The chain saw apparatus 100 may include a sharpening element 102, an actuator 116, a guide bar 104, a drive sprocket 106, and a saw chain 108. The saw chain 108 may include various link components, for example, a cutter link 110 having a cutting edge 308 that is suited for top surface sharpening, as opposed to in gullet sharpening as is typical in traditional sharpening methods. Cutter link 110 may also have a depth gauge 306 that precedes the cutting edge 308 and helps set the depth of cut. The chain 108 may also include an opposing tie strap 210 having a forward portion that may be generally shaped similar to the forward portion of the cutter link 110, such that it creates a complementary tie strap depth gauge 212 that corresponds to the cutter link depth gauge 306. The chain may further include a center link having a projection element 112, and/or a drive link 114. Various other links and/or components may be included without deviating from the scope of this disclosure. For example, a saw chain may additionally include one or more conditioning links.

In accordance with various embodiments, the saw chain 108 may be driven around the guide bar 104 by a drive sprocket 106 during operation. The saw chain 108 may include individual cutting links 110 configured to cut an amount of material dependent upon the height of the depth gauge 306 of the cutting link 110, and if used, the complementary opposing tie strap depth gauge 212. As the cutting links 110 traverse the guide bar 104 and contact material, they may experience wear resulting in a decreased ability to cut. Consequently, a sharpening element 102 may be positioned proximate to the saw chain 108 and coupled to an actuator 116. Upon actuation of the actuator 116, the sharpening element 102 may be brought into contact with the various links of the saw chain 108, for example the cutter links 110, such that an abrasive surface of the sharpening element may grind a portion of the top surfaces of the chain components, thereby sharpening the cutting edge 308 and setting the depth gauge height of the depth gauge 306 and, if used, the complementary opposing tie strap depth gauge 212 height.

While the sharpening element 102 may initially sharpen a cutting element 110, or alternatively, lower a depth gauge 306, 212 to facilitate a cutting operation, the sharpening element 102 may develop one or more grooves. The grooves can lead to a decreased effectiveness of the sharpening element and may cause damage to various saw chain links leading to degradation of the saw chain 108 as a whole. Consequently, one or more links may be provided to increase the effectiveness of the sharpening element 102, as will be described in more detail herein.

Sharpening element 102 includes a stone holder 103 and a sharpening stone 105. Sharpening stone 105 has a curved surface 117. Actuator 116 may bring the curved surface 117 of sharpening element 102 into contact with one or more links of the saw chain 108 through a lever arm 118. Lever arm 118 may rotate with respect to a body 120 of chain saw apparatus 100 about a pivot point 122. The lever arm 118 may travel on a path between a fully unengaged position in which the sharpening element 102 is not in contact with the saw chain 108 and an engaged position in which the sharpening element 102 is in contact with the saw chain 108. Lever arm 118 may be biased, e.g., spring-loaded, to the fully unengaged position. As actuator 116 is pulled away from saw chain 108, sharpening element 102 may move toward saw chain 108. Actuator 116 is located below a front handle 121 of the chainsaw apparatus 100 so that the user may actuate actuator 116 with one or more fingers while maintaining a grip on front handle 121.

The sharpening element 102 may be subjected to considerable force when in contact with the various links of saw chain 108 while saw chain 108 is in motion, i.e., while saw chain 108 traverses guide bar 104 and/or drive sprocket 106. In some cases, the force may cause sharpening element 102 to move and/or rotate laterally, i.e., perpendicular to the plane of the guide bar. The movement and/or rotation of the sharpening element may lessen the effectiveness of the sharpening element, may cause the sharpening element to become misaligned, and/or may damage the cutting edges of the cutter links.

Figure 1B:
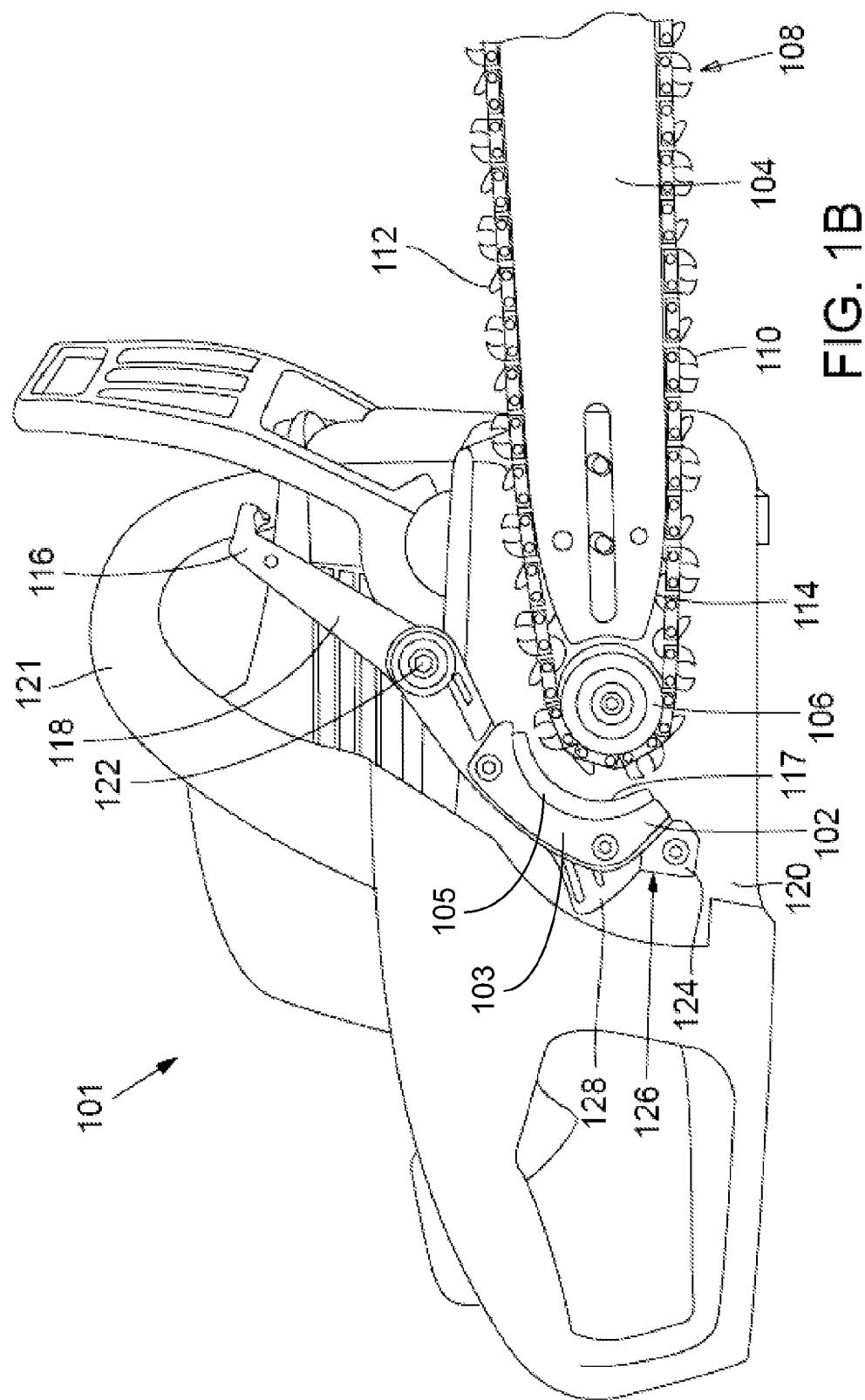
FIG. 1B illustrates an alternative embodiment of a chainsaw in accordance with various embodiments.
Figure 1C:
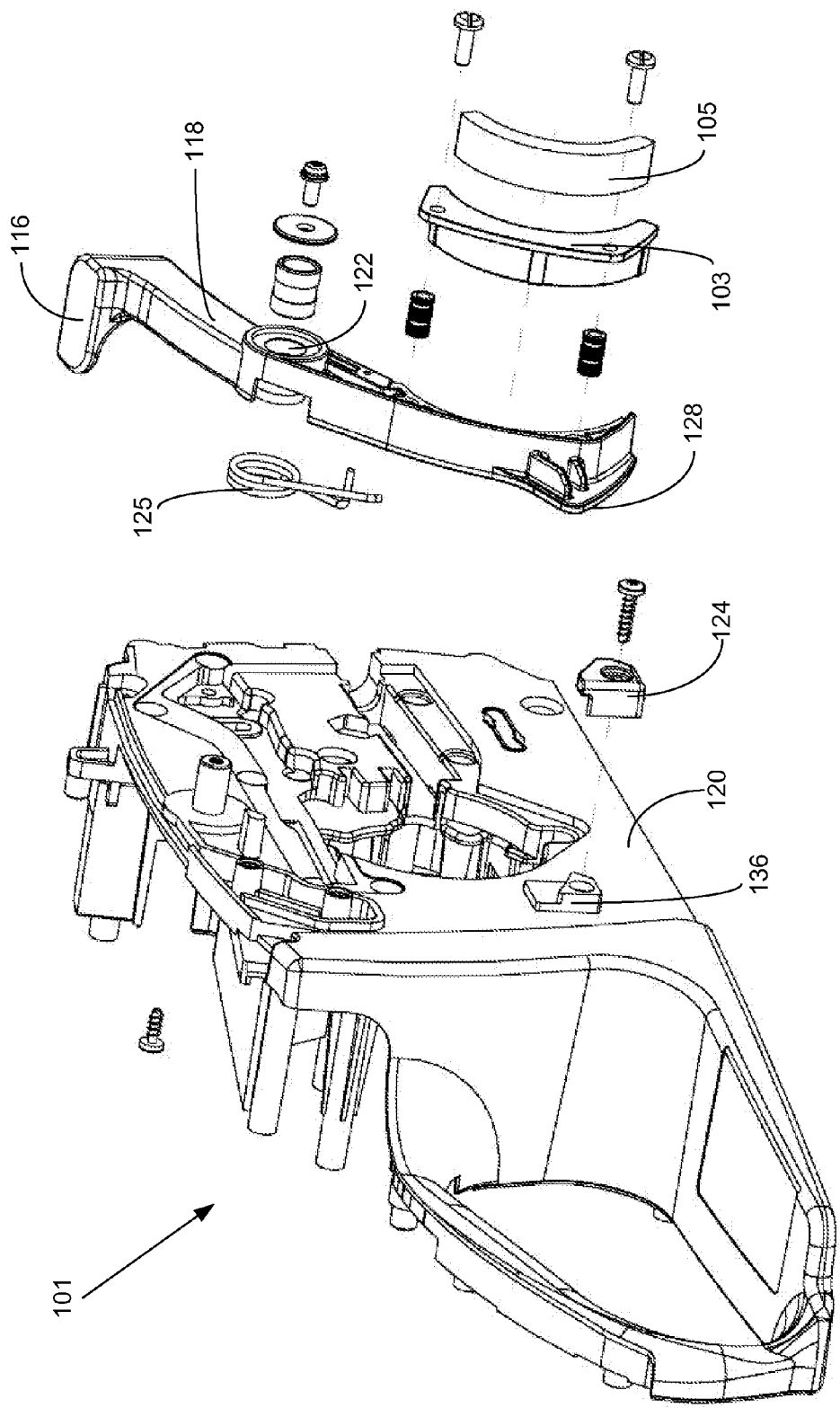
FIG. 1C illustrates an exploded view of a lever arm in accordance with various embodiments.

Accordingly, FIGS. 1B-C show a chainsaw apparatus 101 that includes a retainer guide 124 on body 120 and a support element 128 on lever arm 118. Retainer guide 124 is coupled to the body 120 of chainsaw apparatus 101 and forms a groove 126 with a raised lateral support 136 on the body 120. The lever arm 118 includes a support element 128 configured to be at least partially disposed in groove 126. In some embodiments, at least a portion of support element 128 may be disposed within groove 126 during the entire path of the lever arm 118. In other embodiments, there may be points along the path of the lever arm 118 in which the support element 128 is not disposed within groove 126. However, at least a portion of support element 128 may be disposed within the groove 126 when the lever arm 118 is in the engaged position. Support element 128 may or may not contact groove 126. Lever arm 118 is biased in an unengaged position by spring 125.

Retainer guide 124 and support element 128 provide lateral support to sharpening element 102. The lateral support may reduce lateral movement and/or rotation of sharpening element 102 when sharpening element 102 is in contact with saw chain 108 as saw chain 108 traverses the drive sprocket 106 and/or guide bar 104. The lateral support may improve the effectiveness of sharpening element 102. Furthermore, the lateral support may prevent/reduce misalignment of the sharpening element 102.

Figure 1F:
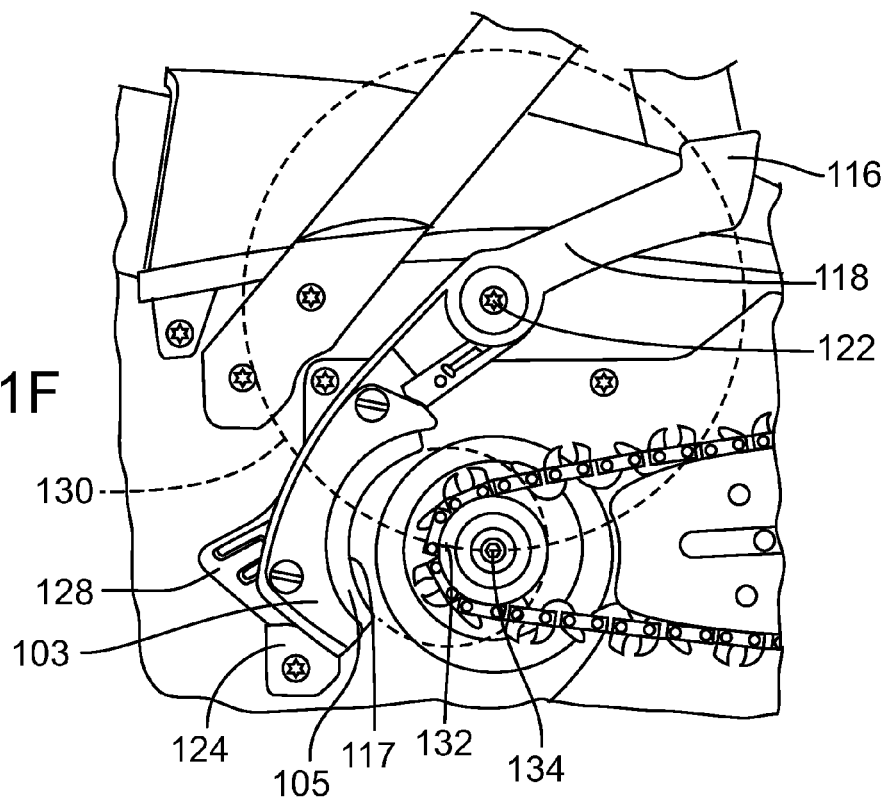
FIG. 1F illustrates a lever arm in accordance with various embodiments.

The sharpening element 102 travels on a path from an unengaged position, shown in FIG. 1D, to an engaged position, shown in FIG. 1E. Referring now to FIG. 1F, a path line 130 of a center of curvature 132 of the curved surface 117 is shown. Path line 130 shows the path of the center of curvature 132 extended past the engaged position. Path line 130 passes through a center 134 of drive sprocket 106. Accordingly, when the lever arm 118 is in the engaged position, the curved surface 117 of sharpening element 102 may contact the cutter links of the saw chain (not shown in FIG. 1F) with substantially tangent contact. The substantially tangent contact may facilitate the sharpening process and prevent the top plate of the cutter link from catching the lower edge of the sharpening element, which may otherwise chip the sharpening element and/or damage the cutter top plate.

Figure 1G:
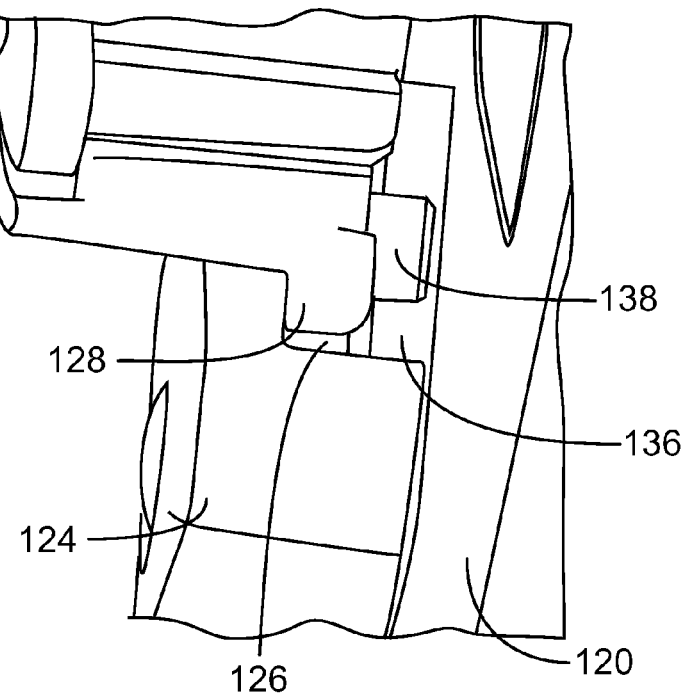
FIG. 1G illustrates a partial view of a retainer guide in accordance with various embodiments.

Referring now to FIG. 1G, the body 120 of chainsaw apparatus 101 further includes a raised lateral support 136 that extends from the surface of body 120. Additionally, support element 128 includes a projected boss 138 that slides against body 120. Both raised lateral support 136 and projected boss 138 provide lateral support to lever arm 118 to prevent lever arm 118 from moving and/or rotating toward body 120. Additionally, raised lateral support 136 and projected boss 138 provide a gap between the lever arm 118 and body 120, which facilitates clearing of debris.

As discussed above, the sharpening stone 105 may be coupled to the lever arm 118 by stone holder 103. FIGS. 1H-I illustrate perspective views of stone holder 103. The stone holder 103 has a curved front surface 140 that couples with the sharpening stone 105 and a curved rear surface 142 that faces a curved mounting surface of the lever arm 118, as shown in FIG. 1C. The stone holder 103 further includes a mounting plate 144 having holes 146 and 148 for releasably coupling the mounting plate 144 to the side of lever arm 118. The mounting plate 144 is substantially perpendicular to the front surface 140 of the stone holder 103.

The rear surface 142 of the stone holder includes contacting portions 150, 152, and 154. The surfaces of contacting portions 150, 152, and 154 contact the mounting surface of the lever arm 118. The contacting portions 150, 152, and 154 are separated on rear surface 142 by recessed portions 156 and 158. Contacting portions 150 and 154 are disposed at opposite ends of rear surface 142, while contacting portion 152 is disposed substantially in the center of rear surface 142. The contacting portions 150, 152, and 154 may provide a proper fit and may distribute the forces from sharpening the saw chain over the mounting surface of the lever arm 118.

As depicted in FIGS. 1H-1I, the surfaces of contacting portions 150, 152, and 154 of the stone holder are substantially perpendicular to the mounting plate 144 of stone holder 103. The recessed portions 156 and 158 are ramped downward toward a peripheral portion 160 of the rear surface so that the recessed portions 156 and 158 are further recessed from the contacting surfaces 150, 152, and 154 as they move away from the mounting plate 144. In this ramped configuration, a width 162 of the stone holder 103 between the front surface 140 and the recessed portions 156 and 158 of the rear surface 142 is greatest where it intersects with mounting plate 144 and tapers lower toward the peripheral portion 160. The ramped configuration of the recessed portions 156 and 158 may facilitate removal of the stone holder 103 from a mold during manufacturing, while the contacting portions 150, 152, and 154 may provide alignment and support of the sharpening stone 105.

Referring now to FIG. 2, a length of saw chain 200 is illustrated, in accordance with various embodiments. The length of saw chain 200 may include cutter links and non-cutting links, for example, top sharp type cutter links 202, opposing tie straps 210, drive links 204, and/or tie straps 206. In various embodiments, center links and/or drive links 204 may include a projection element or stabilizer portion 208 that is adapted to engage the sharpening element as the chain component traverses the drive sprocket or nose sprocket of the guide bar. The length of saw chain may also include other components such as a conditioning link or dresser link 502, illustrated more clearly with reference to FIG. 5. The saw chain 200 may be configured in an endless loop and entrained on a guide bar of a chain saw for cutting operations.

Cutter links 202 may include a variety of operative portions that can individually or collectively assist in improving the sharpening of the cutter link during operation. For example, with reference to FIGS. 3A-3C, a cutter link 202 may include a rear portion which defines a cutting portion 302 that may have cutting edges 308 that are ground to a predetermined rake angle, an upstanding portion at the forward end of the cutter link 202 which is generally referred to as a depth gauge 306. In various embodiments, the cutter link 202 may include a brace portion 304.

In various embodiments, the cutting portion 302 may be a twisted cutter portion that is adapted to be sharpened on an upper edge and/or side portion to form and maintain cutting edge 308. The twisted cutter portion may be formed by twisting material integral with the cutter link 202 into a position wherein the cutting edge 308 is substantially transverse to a cutting direction of the utility chain 200. In various embodiments, substantially transverse may be defined as forming an angle between ten and sixty degrees with respect to a perpendicular line formed with respect to the cutting direction of the utility chain. Unlike prior twisted cutters, the twisted cutter portion 302 may be formed by a twist that occurs towards a distal end of the material intended to form the cutting portion. For example, a twisted cutter portion 302 may include an aggressive twist leaving a portion of the material generally suitable for the cutting portion 302 in plane with the body of cutter link 202. In various embodiments, material left in the plane of the cutter link 202, may be utilized as a bracing portion 304, which will be discussed in further detail herein. A twisted cutter portion 302, leaving material in the plane of the cutter link 202, may have an increased resistance to breakage.

In various embodiments, the cutting portion 302 may be formed by a twist of the upper portion of the cutter link, thereby generating an angle twist axis or chord 312. Having an angled twist chord and/or a brace portion 304 may provide for better support of the cutting edge and allow the cutting portion to better withstand the operational forces imposed in a cutting or sharpening operation.

In various embodiments, the twisted cutter portion 302 may include brace portion 304 and configured to direct cutting forces to the brace portion 304. The brace portion 304 may be substantially in plane with the cutter link result from the application of twist axis 312 that is substantially above a center line 310 of the cutting link 202 passing through rivet holes 316A and 316B. In various embodiments, the twisting axis may be directed at an acute angle 314 toward the toe of the cutting link, thereby helping to form brace portion 304. The twisting axis 312 may have an apex 318 or high point at the top of the brace portion 304. In various embodiments, the apex 318 of the brace portion 304 may have a height of approximately 0.4 inches above the rail engaging heel of the cutter link. In other embodiments, the brace portion may have a height of greater than 0.250 inches. The inclusion of a brace portion 304 may act to resist breakage of the cutter link 202 by providing a maximum cross section of material that is in plane with the cutting forces.

In various embodiments, such that the twist axis 312 may be angled with respect to center line 310 passing through the centers of rivet holes 316A, 316B. In one embodiment, the twist axis 312 may form an acute angle 314 in the range of 10 degrees to 70 degrees with respect to the center line 310 (see FIG. 3A), and may be angled toward the toe (as illustrated) or towards trailing links.

Figure 3A:
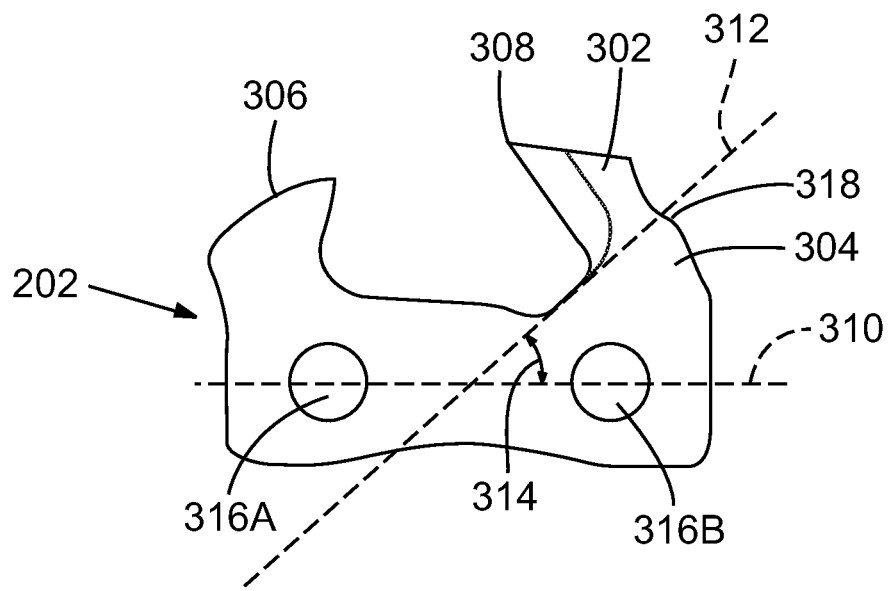
FIGS. 3A-3C illustrate a cutter link in accordance with various embodiments.
Figure 3B:
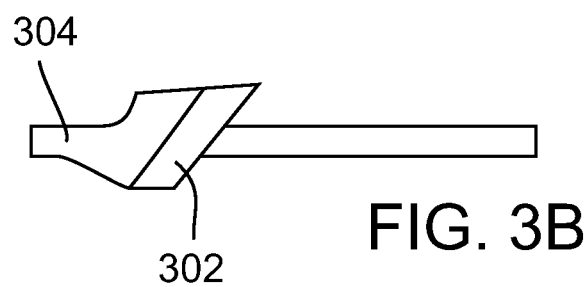
Figure 3C:
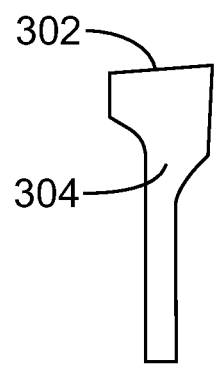

Twisted cutter link 202 may additionally include a depth gauge 306. In various embodiments, depth gauge 306 may lead the cutting edge 308 into the material to be cut and help limit the depth the cutting edges 308 penetrate into various materials. Twisted cutter link 202, as illustrated in FIGS. 3A-3C may include a first depth gauge portion 306 integral with the twisted cutter link. In addition, a second depth gauge 212 may be formed on the opposing tie strap 210 and configured to be complementary to the cutter depth gauge 306, thereby forming a double depth gauge. The increased width of the depth gauge not only improves effectiveness of the depth gauge for controlling depth of cut, but also provides better lateral stability for the cutter link 202 during the sharpening operation. This may result in a more consistent sharpening of the cutting edge, and may further help condition the sharpening element. In various embodiments, the position of the first and second depth gauges 306, 212 may be farther from a center of the cutter link than an upper edge of the cutter link is from the center of the cutter link.

As illustrated in FIG. 2, with a second depth gauge 212 positioned on the opposing tie strap 210 of the twisted cutter link 202, a gap 214 may be formed between the two opposing depth gauges 306, 212. In various embodiments, in addition to limiting the amount of material cut by the twisted cutter portion 302, the depth gauges may also serve to condition the sharpening element as they traverse the drive sprocket. In various embodiments, the depth gauges 306, 212 may also serve to, for example, generally square a groove that is worn into a sharpening element, for example, from repeated use. Additionally, the depth gauges may also stabilize the chain from rotational and/or lateral movement when contacting the sharpening element as the depth gauges traverse the drive sprocket. The extra point or points of contact provided by the depth gauges may reduce the likelihood of tipping the chain.

In various other embodiments, a cutter link may comprise an aggregate type cutter including an abrasive disposed on an upper surface. In order to expose an abrasive disposed on the upper surface, a build up or coating may need to be removed. The coating or upper layer of an abrasive may be removed by the sharpening element. This may, for example, expose a diamond matrix to the material being cut.

Still with reference to FIG. 2, tie straps 206 and center links/drive links 204 are illustrated in accordance with various embodiments. Drive links 204 are illustrated with a stabilizing portion 208 that protrudes in a generally upward direction above the chassis of the chain. Center links may also include stabilizing portions 208. As illustrated, drive links 204 may be configured with a tang portion that engages a drive sprocket and nose sprocket of the chain saw in order to facilitate movement of the chain around the guide bar. The drive tang may also engage the groove of the guide bar to facilitate positioning of the saw chain around the periphery of the guide bar. The drive tang may be configured in a variety of manners depending upon, for example, the intended application of the saw chain. For example, a drive tang may be configured with a clean out portion for wood cutting applications, or without a clean out portion for use in, for example, aggregate applications. Projection element 208 may be integral with the drive link 204. Alternatively, the projection element 208 may be separate from the drive link 204 and merely fastened to the drive link.

Figure 4:
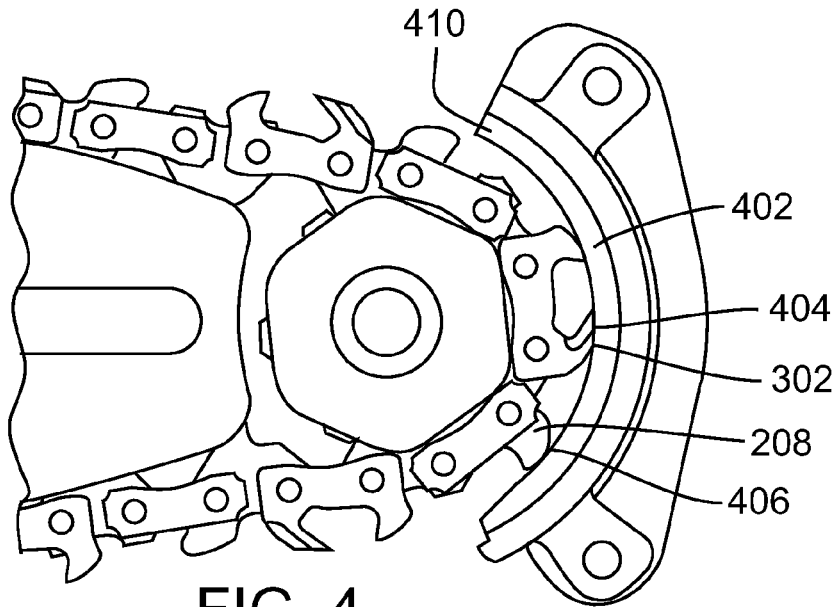
FIG. 4 illustrates a saw chain and sharpening stone interface in accordance with various embodiments.

Referring to FIG. 4, the projection element 208 on the drive link may be disposed such that the projection contacts the sharpening element to form one of multiple (three or more) points of contact 402, 404, 406 between the saw chain and the sharpening element. In various embodiments, for example, the points of contact may include a first point of contact being the cutter contact 404, a second point of contact being the depth gauge contact 402, and a third point of contact being the projection element or stabilizer contact 406. These points of contact may increase stability of the saw chain as it traverses the drive sprocket by, for example, reducing gaps between components that could result in impacting between the sharpening element 410 and the chain components. In various embodiments, the third point of contact may be made by a second depth gauge disposed on an opposing tie strap, as previously discussed, or by a leading or trailing cutter or depth gauge where, for example, a full sequence chain is utilized. In various embodiments, more than three points of contact may be utilized to further increase stability of the saw chain as it traverses the drive sprocket.

The projection element 208 may also be configured to remove a portion of material from a sharpening element 410 to facilitate effective sharpening over the life of the chain. In various embodiments, a cutter element 302 may form a groove or wear pattern in a sharpening element 410 through successive contact with the sharpening element 410. Various features of the cutter link, such as depth gauges, may additionally form grooves. In one embodiment, a saw chain may utilize left-hand and right-hand cutter links and depth gauges. The left-hand and right-hand depth gauges may form two grooves within a larger groove formed by the cutting edge of the cutter links. The projection element 208 may be configured to remove the material located between the two grooves formed by the depth gauges, which may in turn enhance the effectiveness of the sharpening during the life of the chain.

In various embodiments, the projection element 208 may act to better conform the position of the chain chassis (e.g. saw chain), and thereby the cutters, to the shape of the sharpening element, such as an abrasive stone or sharpening device. By conforming the saw chain to the shape of the abrasive stone 410 or sharpening element, the projection element 208 may minimize impact damage to various links as they traverse the drive sprocket and contact the abrasive stone 410.

In various embodiments, to ensure that the projection element 208 does not interfere with the cutting operation, the position of the projection may be disposed farther from the center of the drive link than the depth gauge is from the center of the cutter link. Further, in various embodiments, the depth gauges may be farther from the center of the cutter link than the cutting edge of the cutting link is from the center, in order to ensure an appropriate depth of cut is created as the cutter link traverses the sharpening element.

Figure 5:
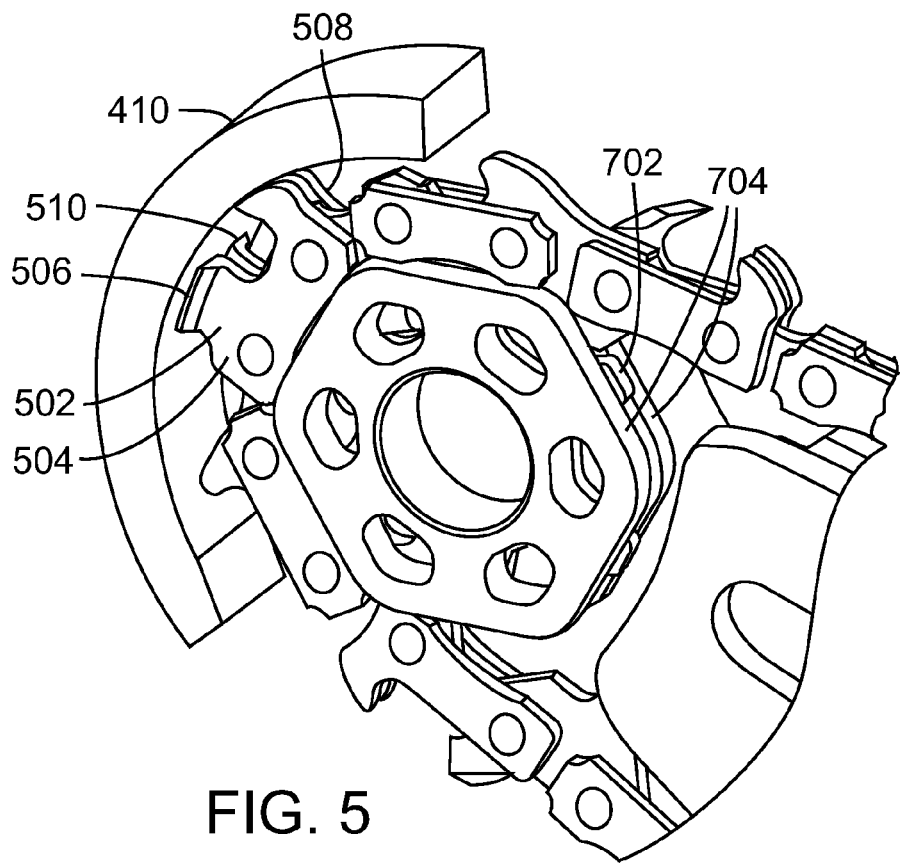
FIG. 5 illustrates a saw chain and sharpening stone interface in accordance with various embodiments.

Referring now to FIG. 5, chain 200 may also include a conditioning link 502, in accordance with various embodiments to condition (e.g. reform, treat, clean and/or maintain) the sharpening element 410. As a cutter link 202 traverses a drive sprocket 700 and contacts a sharpening element 410, for example an abrasive stone, a groove may be worn into the stone. The groove may become improperly formed or deformed (e.g. rounded edges) over time for a variety of reasons. A deformed groove may lead to a reduction in the sharpening effectiveness of the sharpening element 410. Therefore, in various embodiments, a conditioning link 502 having a desired geometrical configuration may be included in the saw chain 200 and help facilitate reformation and/or maintenance of a groove in the sharpening element 410.

In various embodiments, conditioning link 502 may include a first link plate 504 having a portion upstanding that defines a first plane. An upper surface 506, integral with the upstanding portion, may be bent out of the first plane and, in various embodiments, include a surface curvature. Conditioning link 502 may additionally include second link plate 508 disposed opposite the first link plate 504 having similar characteristics. The first upper surface 506 and the second upper surface 510 may extend generally away from a centerline of the utility chain. In various embodiments, the conditioning links may include at least one of a curved upper surface extending from a leading edge to a trailing edge, a tapered surface extending from one edge to another edge, a tapered leading edge, a tapered trailing edge, or a combination thereof.

The upper surfaces 506 and 510 may be configured with a conditioning material adhered to their upper surfaces, wherein the conditioning material is configured to condition a sharpening element. The conditioning material, in various embodiments, may clean, shape, condition, and/or reform a sharpening element. The conditioning material may be an abrasive, such as diamond elements, or alternatively, a cleaning agent configured to clean debris out of a sharpening element.

In various embodiments, the upper surface 506 of the conditioning link 502 may be disposed at a predetermined height relative to other links within the saw chain. For example, the conditioning link 502 may be configured with a height below an estimated height of a cutter link at the end of its useful life. This may reduce the tendency of the conditioning link 502 to impact the material being cut throughout the lifetime of the chain 200.

The conditioning or dresser links 600 may take a variety of configurations, some of which are illustrated in FIGS. 6A-6D, and 6AA. The dresser links may be left-handed links, righthanded links, or alternatively, continuous body links. In various embodiments, the dresser links may be generally configured similar to a typical cutting link, and have an upper surface 602 containing a conditioning material, such as a diamond impregnated coating. In other embodiments, the dresser links may have a delayed contact gauge (e.g. similar to a depth gauge, raker, or other protrusion) 604 leading the abrasive surface 602 that is designed to delay contact between the dresser link diamond abrasives and the stone as it rounds the drive sprocket until the chain has created a shallow groove in the stone. This may delay unintended wear of the abrasive material and prevent premature wear of the sharpening element.

In various embodiments, as illustrated in FIGS. 6A-6D, the curvature, shape, length, width and other geometrical factors of the abrasive carrying surface of the dresser link may be altered as desired in order to help improve the conditioning performance of the link. In various embodiments, the abrasive carrying surface 602 of the dresser link 600 may extend generally laterally outward, e.g. generally transverse of the direction of travel, such that it creates a path that is wider than the path of the cutter links. In various embodiments, the outward extension 606 of each side of the abrasive surface may be in the range of 0.010" to 0.030" more than a corresponding side of a cutter. In various embodiments, the side of the abrasive surface 602 may be less than the width of the cutter element 202. In various embodiments, the overall width of the abrasive surface (including a single conditioning link or a right hand and left hand pair) may be in the range of 0.16" to 0.40" in hand held saws and 0.28" and 0.63" in mechanical harvester machines. Providing a wider path of the abrasive surface can provide for a wider groove in the sharpening element 410 so the cutting edge corners do not contact the groove bottom radii or the side walls of the groove.

In various embodiments, the shape of the dresser link 600 may be configured such that only a portion of the abrasive surface is adapted to contact the sharpening segment, and as the abrasive surface 602 wears away, fresh portions of the abrasive surface may be adapted to engage the surface of the sharpening element 410. This may provide for a longer life of the chain 200, sharpening segment and/or abrasive dresser segments. For example, a surface curvature of the upper surface 602 may be tapered towards the back, such that the forward portion 610 of the dresser link wears first (e.g. FIG. 6A). As the forward portion 610 wears away, fresh abrasive material will encounter the sharpening element 410. Further, in this configuration, more support is provided for the abrasive material as the abrasive behind the forward portion 610 may act as a support.

Referring to FIG. 6D, the abrasive surface orientation may be tapered in the front, such that the first contact with the sharpening element is at the rear portion 608 of the dresser link 600. Upon wear, the engagement surface moves progressively forward, and in some embodiments lower, as the abrasive material is worn away (e.g. diamonds are lost or worn). Wearing in such a manner presents new abrasive components (e.g. diamonds) to the sharpening element 410. Further, it may also allow the dresser link 600 to reduce in height as the cutters 202 also reduce in height with each sharpening, thereby enhancing performance. Such a configuration may also allow the abrasive material to engage the sharpening element 410 in a smoother less abrupt manner; however, the abrasive elements may be more inclined to separate from the dresser link for lack of support.

In another embodiment, the upper surface may be generally curved, or may taper in the front and in the rear in an arcuate fashion. These configurations may allow the middle portion as the portion that engages the sharpening element first, and as it wears, abrasive elements in front of and behind the wear portion condition the sharpening element. In various embodiments, the upper surface may taper from one end to another end, such as from the leading edge to the trialing edge, or visa versa.

Figure 9:
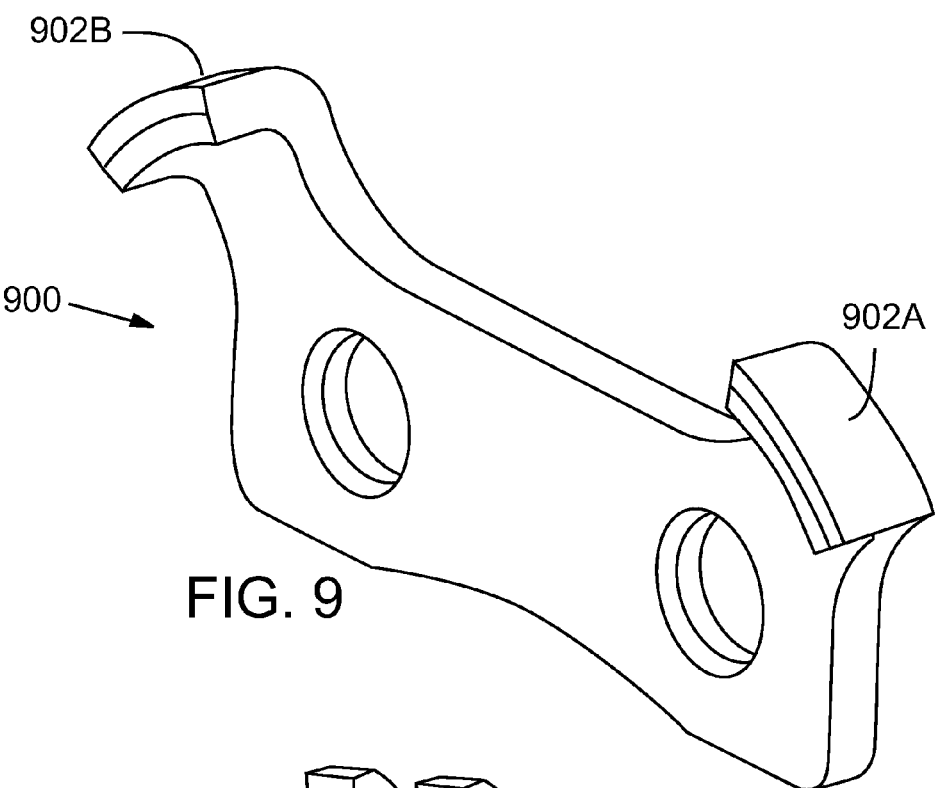
FIG. 9 illustrates a dresser link in accordance with various embodiments.

With reference to FIG. 9, another embodiment of a conditioning link 900 is illustrated. The conditioning link 900 may have two exposed surfaces 902A, 902B with an abrasive coating for conditioning the sharpening element 410. For example, instead of having a depth gauge, the dresser link 900 may have a second dresser surface. The dresser surfaces may be configured as right hand links, left hand links, or a single dresser link that includes a first side and an opposing second side with the abrasive surface coupling the two together.

Figure 10:
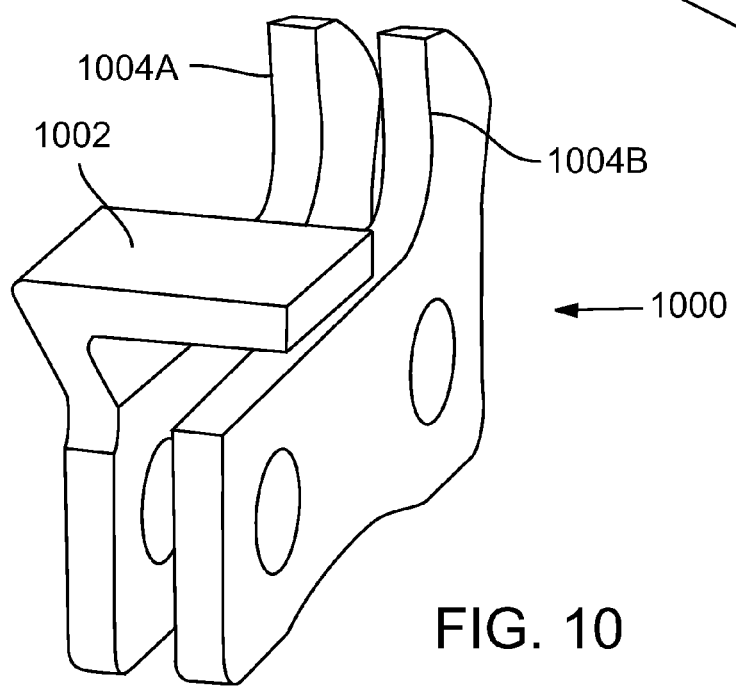
FIG. 10 illustrates another dresser link in accordance with various embodiments.

With reference to FIG. 10, another embodiment of a conditioning link 1000, is illustrated. The conditioning link 1000 may include a first link plate having a substantially unitary surface 1002 extending over a center-line of a utility chain 200. The substantially unitary surface may be configured to expose an abrasive material to the sharpening element 410. The surface 1002 may be configured to provide a generally planar surface that has a width substantially similar to or less than a kerf of the cutting chain 200. In various embodiments the conditioning link 1000 may include a depth gauge 1004A disposed in front of the substantially unitary surface 1002. Additionally, and similar to an embodiment of the cutter link 202, the conditioning link 1000 may similarly include a tie strap disposed opposite the conditioning link 1000, which includes a complimentary depth gauge 1004B.

In various embodiments, the density and placement of the diamond or other abrasive elements may be controlled as desired. For example, having a relatively low density of abrasive elements may provide for a uniform conditioning of the sharpening element groove, surface or other interface. In various embodiments, the abrasive elements may be stacked vertically in one portion of the cutter link to allow for conditioning of a surface or groove having a varied profile. Abrasive elements may be disposed about the perimeter and part of the sides of the dresser link surface in order to ensure proper groove width, for example.

Figure 7:
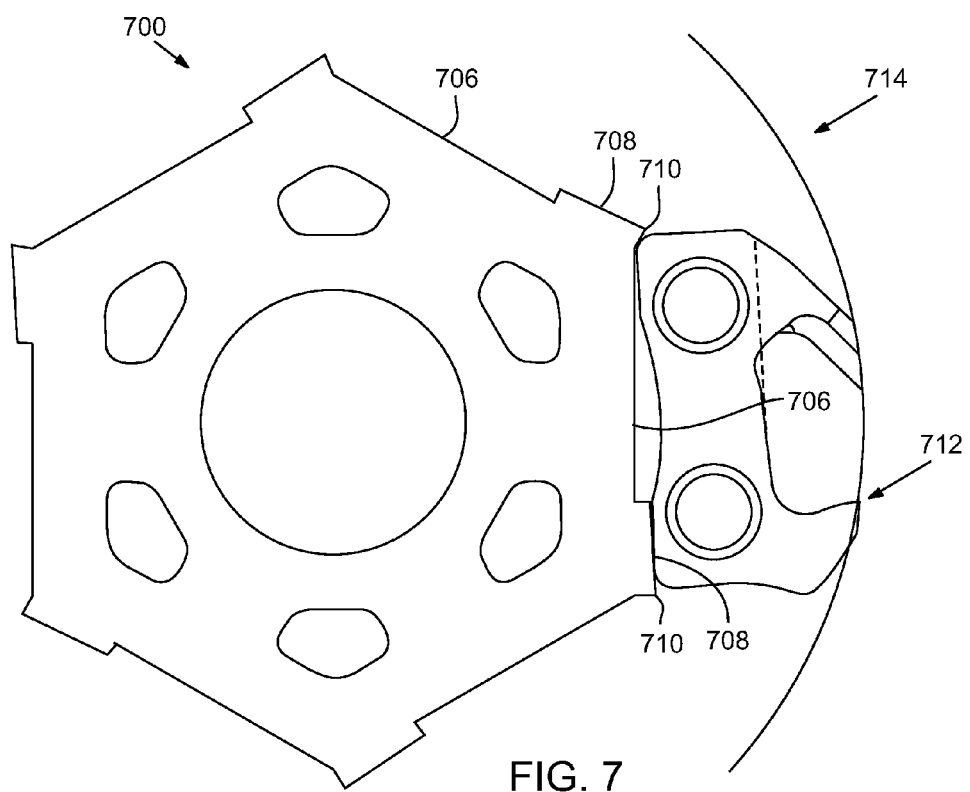
FIG. 7 illustrates a drive sprocket, saw chain and sharpening stone interface in accordance with various embodiments.

Referring now to FIGS. 5 and 7, a drive sprocket in accordance with various embodiments is illustrated. The drive sprocket may include radially directed sprocket teeth 702 forming a plurality of gullets configured to engage one or more drive links. The radially directed sprocket teeth 702 may be disposed co-axially between two support rims 704. The support rims 704 may include a plurality of facets 706 configured to support various links as they traverse the sprocket and sharpening element. The multi-faceted drive sprocket 700 may include one or more facets having a variable length. In one embodiment, the length may be generally equal to or slightly greater than the footprint length of various links within the saw chain. This may provide adequate support for the links and additionally provide a mechanism to resist slipping or rocking during traversal of the drive sprocket.

The plurality of facets 706 may be geometrically configured to engage more than one point of the bottom of various saw chain links. For example, the facets may be substantially flat, or alternatively, may include various features, such as a step 708 or slope, to facilitate positioning of the saw chain links as they traverses the drive sprocket 700. The supportive surface may reduce the tendency of various links to rock or otherwise engage in undesirable movement, and may better position the cutting edges of a cutter link for sharpening by the sharpening member. Additionally, the facets 706 of the drive sprocket 700 may include a lip 710. The lip 710 may provide support to the cutter link and resist reward movement caused by the frictional forces generated by the interface between the sharpening element and the cutting link components (e.g. cutting elements and/or depth gauges). The lip 710 may be of a variety of geometrical configurations The faceted drive sprocket 700 can also be configured so that the cutter link is oriented to expose more of the cutter's depth gauge to the action of the sharpening element than the cutting edge, as illustrated by the exposed depth gauge 712 in FIG. 7. This may result in more material being removed from the depth gauge relative to the cutting edge 308, and consequently, maintain the depth gauge setting throughout successive sharpening of the cutter links.

Figure 8A:
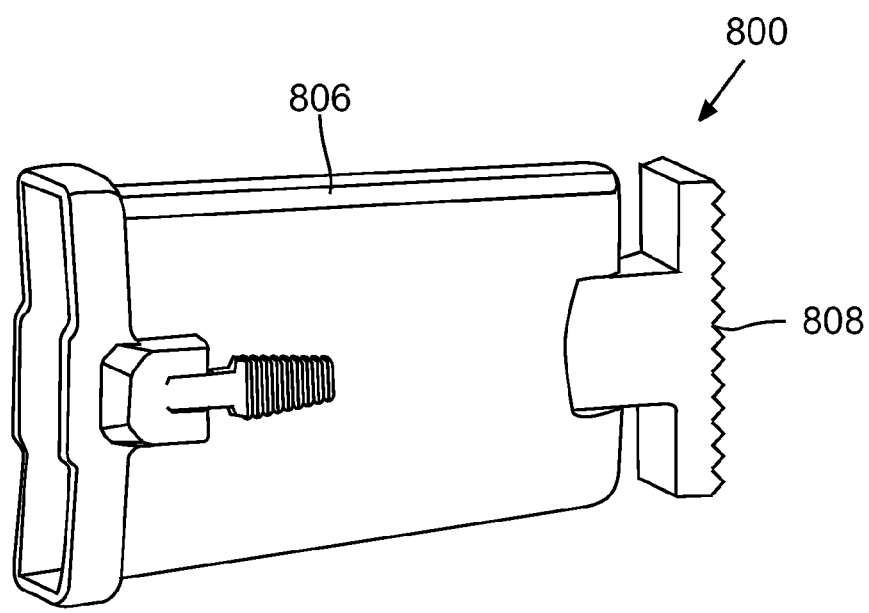
FIGS. 8A-8B illustrate a sharpening housing suited for nose coupling in accordance with various embodiments.
Figure 8B:
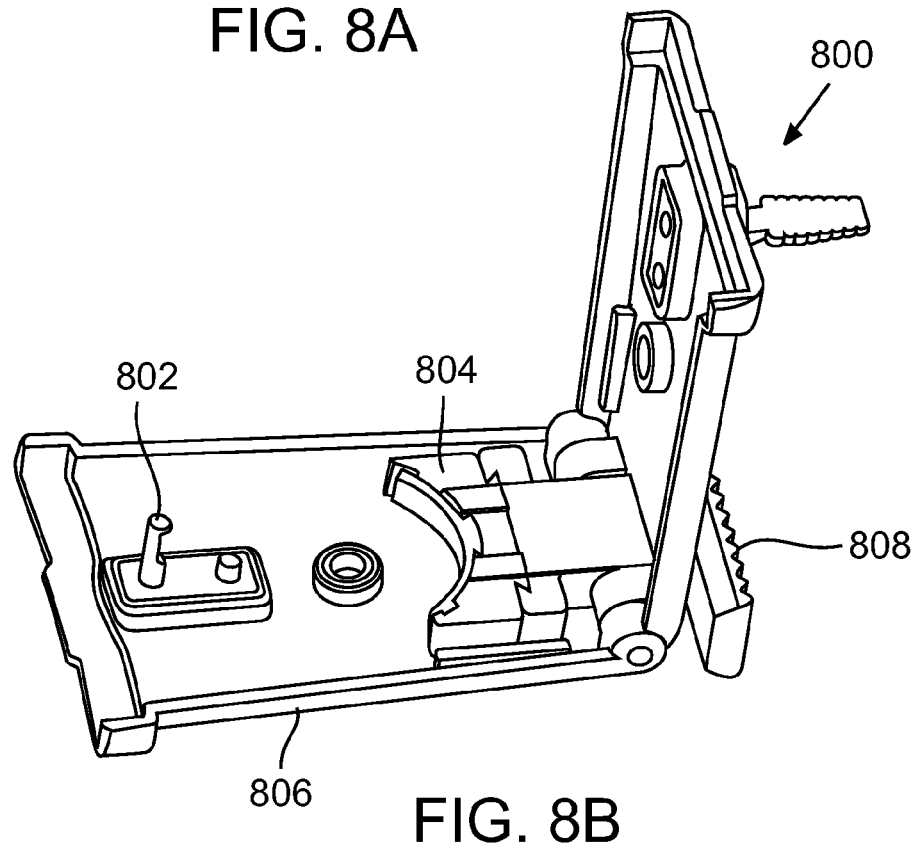

Referring to FIGS. 8A-8B, a saw chain sharpening fixture 800 is illustrated in accordance with various embodiments. The saw chain sharpening fixture may include one or more locating members 802, such as one or more locating pins, configured to align a guide bar to the saw chain sharpening fixture 800, a sharpening element 804 configured to sharpen one or more cutting links as they traverse a nose of the guide bar, and an actuator 808 configured to selectively bring the sharpening element 804 into contact with the one or more cutting links.

In various embodiments, the bar mounted saw chain sharpening fixture may include a housing 806 configured to attach to a nose of saw chain guide bar in a clamping manner. The housing may include a locating member 802 such as one or more alignment pins that are configured to mesh with corresponding slots or holes in the guide bar. With a guide bar correctly positioned on the locating member 802, the housing fixture may clamp onto the guide bar and allow the chain to freely move about the nose of the guide bar. A tension clamp may engage the locating member to ensure relatively solid connection such that movement of the housing relative to the guide bar does not occur during a sharpening operation.

In various embodiments, an actuator 808 may be used to bring a sharpening element 804 into contact with the cutting elements. The actuation device 808 may include a biased lever (e.g. spring loaded) communicatively coupled to the sharpening element. Upon actuation of the actuation device, for example by pushing the housing 806 against a hard surface via a force directed at the chain saw, the abrasive stone 804 may be moved into a cutting radius of saw chain. In various embodiments the actuation device 808 may be configured so as to resist a motion that would bring the sharpening element 804 into contact with the saw chains. For example, a spring may force the sharpening element 804 against the distal end of the housing 806. This may prevent unwanted contact of the sharpening element 804 with the saw chain links. The spring may be configured with a spring constant equivalent or substantially equivalent to a weight of a chain saw. Consequently, only a slight force may be needed to bring the sharpening element 804 into contact with the saw chain links. Those of ordinary skill will readily see other actuation devices 808 may be utilized without deviating from the scope of the invention. Further, in various embodiments, the sharpening element may be carried by a removable cartridge that has a coupling pattern allowing the cartridge to be removed and replaced when the sharpening element is worn.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A saw chain sharpening fixture, comprising:
   a lever arm coupled to a body portion of a chainsaw at a pivot point;
   a sharpening element on a first end portion of the lever arm, the sharpening element configured to sharpen one or more cutter links of a saw chain as the saw chain traverses a guide bar;
   an actuator configured to rotate the lever arm to selectively bring the sharpening element into contact with the one or more cutter links;
   a retainer guide coupled to the body portion of the chainsaw and having a groove; and
   a support element coupled to the lever arm and configured to be disposed within the groove of the retainer guide when the sharpening element is in contact with the one or more cutter links of the saw chain;
   wherein the groove is configured to provide lateral support to the lever arm when the support element is disposed within the groove.

2. The saw chain sharpening fixture of claim 1, wherein the actuator comprises a handle on a second end portion of the lever arm.

3. The saw chain sharpening fixture of claim 1, wherein the actuator is configured to selectively bring the sharpening element into contact with one or more cutter links of the saw chain as the cutter links traverse a drive sprocket of the guide bar.

4. The saw chain sharpening fixture of claim 3, wherein the sharpening element includes a curved surface providing a sharpening surface area and having a center of curvature, and further wherein a first distance between the pivot point of the lever arm and the center of curvature of the sharpening element may be substantially equal to or within 0.10 inches longer than a second distance between the pivot point and a center of the drive sprocket.

5. The saw chain sharpening fixture of claim 1, wherein the retainer guide is removably coupled to the body portion of the chainsaw.

6. The saw chain sharpening fixture of claim 1, wherein the support element is removably coupled to the lever arm.

7. The saw chain sharpening fixture of claim 1, wherein the support element is configured to be at least partially disposed within the groove of the retainer guide during an entire path of the lever arm.

8. The saw chain sharpening fixture of claim 1, wherein the support element includes a projected boss extending laterally toward the body of the chainsaw.

9. The saw chain sharpening fixture of claim 1, wherein at least one of the support element and the retainer guide is composed of a material that prevents and/or resists linear friction welding.

10. The saw chain sharpening fixture of claim 1, wherein the lever arm is configured to travel on a path between a completely unengaged position in which the sharpening element is not in contact with the saw chain and an engaged position in which the sharpening element is in contact with the saw chain, and further comprising a biasing device biasing the lever arm in an unengaged position.

11. The saw chain sharpening fixture of claim 1, wherein the sharpening element is removably coupled to the lever arm, the sharpening element including a sharpening stone and a stone holder, the sharpening stone coupled to a front surface of the stone holder and a rear surface of the stone holder coupled to the lever arm.

12. The saw chain sharpening fixture of claim 11, wherein the rear surface of the stone holder includes a plurality of contacting portions separated by recessed portions, the contacting portions configured to contact a mounting surface of the lever arm.

\* \* \* \* \*